US012102571B2

(12) United States Patent
Moriarty et al.

(10) Patent No.: US 12,102,571 B2
(45) Date of Patent: Oct. 1, 2024

(54) RELEASABLE SPAR FOR SURGICAL BOOT

(71) Applicant: Allen Medical Systems, Inc., Batesville, IN (US)

(72) Inventors: Joshua J. Moriarty, South Attleboro, MA (US); Jesse S. Drake, Westborough, MA (US)

(73) Assignee: Allen Medical Systems, Inc., Batesville, IN (US)

( * ) Notice: Subject to any disclaimer, the term of this patent is extended or adjusted under 35 U.S.C. 154(b) by 588 days.

(21) Appl. No.: 17/485,826

(22) Filed: Sep. 27, 2021

(65) Prior Publication Data

US 2022/0008278 A1 Jan. 13, 2022

Related U.S. Application Data

(62) Division of application No. 16/229,247, filed on Dec. 21, 2018, now Pat. No. 11,147,730, which is a division of application No. 14/880,619, filed on Oct. 12, 2015, now Pat. No. 10,188,573.

(60) Provisional application No. 62/075,338, filed on Nov. 5, 2014.

(51) Int. Cl.

*A61G 13/12* (2006.01)
*A61G 13/00* (2006.01)
*A61G 13/10* (2006.01)

(52) U.S. Cl.

CPC ....... *A61G 13/125* (2013.01); *A61G 13/0036* (2013.01); *A61G 13/101* (2013.01); *A61G 13/129* (2013.01)

(58) Field of Classification Search

CPC .............. A61G 13/129; A61G 13/0036; A61G 13/101; A61G 13/1205; A61G 13/1235; A61G 13/124; A61G 13/1245

See application file for complete search history.

(56) References Cited

U.S. PATENT DOCUMENTS

| | | | |
|---|---|---|---|
| 542,390 | A | 7/1895 | Linn |
| 612,373 | A | 10/1898 | Allison |
| 891,678 | A | 6/1908 | Downey |
| 891,679 | A | 6/1908 | Downey |

(Continued)

FOREIGN PATENT DOCUMENTS

| | | |
|---|---|---|
| CA | 2554652 | 7/2010 |
| WO | 97/34520 | 9/1997 |
| WO | 2014/029988 | 2/2014 |

OTHER PUBLICATIONS

EP Search Report for Application No. 15192946.0, dated Feb. 29, 2016; 8 pages.

(Continued)

*Primary Examiner* — Justin C Mikowski
*Assistant Examiner* — Alison N Labarge
(74) *Attorney, Agent, or Firm* — Barnes & Thornburg LLP

(57) ABSTRACT

A boot stirrup for use with a surgical table is provided. The boot stirrup includes a support arm, a surgical boot, and a lockable joint coupled to the support arm and the surgical boot. The support arm is configured to couple to a surgical table for movement about a plurality of axes relative to the surgical table. The surgical boot is configured to support and/or immobilize the foot and leg of the patient. The lockable joint is configured to selectively permit movement of the surgical boot relative to the support arm.

20 Claims, 11 Drawing Sheets

(56) References Cited

U.S. PATENT DOCUMENTS 1,160,451 A 11/1915 Sanford
1,662,464 A 3/1928 McCutchen
1,719,614 A 7/1929 McIntosh
1,823,248 A 9/1931 Allison
2,067,891 A 1/1937 Comper
2,193,647 A 3/1940 Rush et al.
2,204,266 A 6/1940 Wilcox
2,257,491 A 9/1941 Armstrong
2,267,924 A 12/1941 Johnston
2,391,717 A 12/1945 Lawrence
2,465,781 A 3/1949 Banta
2,609,261 A 9/1952 Parker
2,630,288 A 3/1953 Eubanks, Sr.
2,642,250 A 6/1953 Kasnowich
2,678,792 A 5/1954 Gallion et al.
2,679,445 A 5/1954 Roehm
2,703,265 A 3/1955 Wolfe
2,732,269 A 1/1956 Astroff
2,801,142 A 7/1957 Adams
2,873,457 A 2/1959 Joy
2,910,061 A 10/1959 Rabjohn
3,085,842 A 4/1963 Johnson
3,090,381 A 5/1963 Watson
3,226,105 A 12/1965 Weickgenannt et al.
3,540,719 A 11/1970 Romney
3,587,592 A 6/1971 Price
3,762,514 A 10/1973 Freitag
3,817,512 A 6/1974 Torrey
3,843,979 A 10/1974 Treace
3,845,945 A 11/1974 Lawley et al.
3,868,952 A 3/1975 Hatton
3,931,654 A 1/1976 Spann
3,944,205 A 3/1976 Mueller
3,946,451 A 3/1976 Spann
3,982,742 A 9/1976 Ford
4,054,282 A 10/1977 Hamer
4,135,504 A 1/1979 Spann
4,163,536 A 8/1979 Heller et al.
4,169,591 A 10/1979 Douglas
4,180,254 A 12/1979 Lee et al.
4,185,813 A 1/1980 Spann
4,221,370 A 9/1980 Redwine
4,252,306 A 2/1981 Johnson et al.
4,284,268 A 8/1981 Gauthier
4,289,122 A 9/1981 Mason et al.
4,323,060 A 4/1982 Pecheux
4,367,869 A 1/1983 Dailey et al.
4,369,588 A 1/1983 Berguer
4,373,709 A 2/1983 Whitt
4,383,351 A 5/1983 Fenwich
D269,908 S 7/1983 Payton
4,407,277 A 10/1983 Ellison
4,418,900 A 12/1983 Ricke
4,426,071 A 1/1984 Klevstad
4,428,571 A 1/1984 Sugarman
4,443,005 A 4/1984 Sugarman et al.
4,471,952 A 8/1984 Spann
4,482,138 A 11/1984 Spann
4,483,336 A 11/1984 Deitch
4,526,355 A 7/1985 Moore et al.
4,536,755 A 8/1985 Holzgang et al.
4,539,763 A 9/1985 Walkhoff
4,545,573 A 10/1985 Murphy
4,551,932 A 11/1985 Schoch
4,564,164 A 1/1986 Allen et al.
4,564,180 A 1/1986 Agee et al.
4,573,482 A 3/1986 Williams, Jr.
4,577,730 A 3/1986 Porter
4,579,324 A 4/1986 McConnell
4,615,516 A 10/1986 Stulberg et al.
4,620,698 A 11/1986 Reed et al.
4,632,349 A 12/1986 Anstey
4,657,003 A 4/1987 Wirtz
4,681,309 A 7/1987 Lechner
4,698,837 A 10/1987 Van Steenburg
4,702,465 A 10/1987 McConnell
4,717,133 A 1/1988 Walsh et al.
4,730,609 A 3/1988 McConnell
4,732,145 A 3/1988 Latham
D297,368 S 8/1988 Womack
4,766,892 A 8/1988 Kreitman
4,782,827 A 11/1988 Paratte
4,802,464 A 2/1989 Déprez
4,807,618 A 2/1989 Auchinleck et al.
4,807,644 A 2/1989 Sandhaus
4,809,678 A 3/1989 Allen
4,827,496 A 5/1989 Cheney
4,840,363 A 6/1989 McConnell
4,886,258 A 12/1989 Scott
4,898,491 A 2/1990 Van Steenburg
4,909,264 A 3/1990 Wadsworth, III et al.
4,913,413 A 4/1990 Raab
4,940,218 A 7/1990 Akcelrod
4,958,816 A 9/1990 Chaney et al.
4,961,416 A 10/1990 Moore et al.
4,966,167 A 10/1990 Jacobs et al.
4,974,830 A 12/1990 Genovese et al.
5,001,739 A 3/1991 Fischer
5,010,900 A 4/1991 Auchinleck et al.
5,027,799 A 7/1991 Laico et al.
5,042,508 A 8/1991 Richard
5,052,128 A 10/1991 Lonardo
5,056,535 A 10/1991 Bonnell
5,074,291 A 12/1991 Carter
5,097,847 A 3/1992 Mikhail et al.
5,104,363 A 4/1992 Shi
5,108,213 A 4/1992 Shields
5,116,008 A 5/1992 Allen
5,135,210 A 8/1992 Michelson
5,156,168 A 10/1992 Canterna
5,157,800 A 10/1992 Borders
5,177,882 A 1/1993 Berger
5,191,903 A 3/1993 Donohue
5,249,377 A 10/1993 Walkhoff
5,263,673 A 11/1993 Yang
5,288,286 A 2/1994 Davis et al.
5,290,220 A 3/1994 Guhl
5,291,903 A 3/1994 Reeves
RE34,661 E 7/1994 Grim
5,369,827 A 12/1994 Parke et al.
5,410,769 A 5/1995 Waterman
5,462,551 A 10/1995 Bailey et al.
5,472,412 A 12/1995 Knoth
5,481,770 A 1/1996 Ahlsten
5,514,143 A 5/1996 Bonutti et al.
5,515,562 A 5/1996 Miller et al.
5,515,867 A 5/1996 Lamb
5,560,577 A 10/1996 Keselman
5,573,501 A 11/1996 Ruscito et al.
5,582,379 A 12/1996 Keselman et al.
5,608,934 A 3/1997 Torrie et al.
5,636,899 A 6/1997 Schiff et al.
5,642,819 A 7/1997 Ronia
5,645,079 A 7/1997 Zahiri et al.
5,672,152 A 9/1997 Mason et al.
D385,040 S 10/1997 Keselman
5,735,806 A 4/1998 Leibovic
5,738,675 A 4/1998 Botimer
5,758,374 A 6/1998 Ronci
5,790,998 A 8/1998 Crescimbeni
5,799,349 A 9/1998 Petersen
5,802,641 A 9/1998 Van Steenburg
5,806,117 A 9/1998 Gotfried
5,888,190 A 3/1999 Meyer et al.
5,888,197 A 3/1999 Mulac et al.
D411,302 S 6/1999 Rowell
5,918,330 A * 7/1999 Navarro ................. A61G 13/12
5/651
5,933,887 A 8/1999 Strange et al.
5,961,085 A * 10/1999 Navarro ................. A47C 16/00
5/624
5,996,954 A 12/1999 Rosen et al.
6,012,185 A 1/2000 Woods et al.
6,012,456 A 1/2000 Schuerch

(56) References Cited

U.S. PATENT DOCUMENTS

| | | | | |
|---|---|---|---|---|
| 6,055,987 | A | 5/2000 | Griesbach et al. | |
| 6,058,534 | A | 5/2000 | Navarro et al. | |
| 6,063,021 | A | 5/2000 | Hossain et al. | |
| 6,066,107 | A | 5/2000 | Habermeyer | |
| 6,070,586 | A | 6/2000 | Harroll et al. | |
| 6,070,587 | A | 6/2000 | Levitt et al. | |
| D427,688 | S | 7/2000 | Lab | |
| 6,085,749 | A | 7/2000 | Wardle et al. | |
| 6,108,841 | A | 8/2000 | Cameron et al. | |
| 6,123,389 | A | 9/2000 | O'Connor et al. | |
| 6,129,085 | A | 10/2000 | Jascomb | |
| 6,154,902 | A | 12/2000 | Russillio et al. | |
| 6,158,436 | A | 12/2000 | Watson et al. | |
| 6,179,263 | B1 | 1/2001 | Rosen et al. | |
| 6,195,820 | B1 | 3/2001 | Heimbrock et al. | |
| 6,202,230 | B1 | 3/2001 | Borders | |
| D441,451 | S | 5/2001 | Tumey et al. | |
| 6,234,173 | B1 | 5/2001 | Hajianpour | |
| 6,263,531 | B1 | 7/2001 | Navarro et al. | |
| 6,276,012 | B2 | 8/2001 | Borders | |
| 6,289,537 | B1 | 9/2001 | Hopper et al. | |
| 6,289,558 | B1 | 9/2001 | Hammerslag | |
| 6,295,672 | B1 | 10/2001 | Vassallo, Jr. | |
| 6,336,412 | B2 | 1/2002 | Heimbrock et al. | |
| 6,378,149 | B1 | 4/2002 | Sanders et al. | |
| 6,408,464 | B1 | 6/2002 | Weismiller et al. | |
| 6,438,777 | B1 | 8/2002 | Bender | |
| 6,446,287 | B2 | 9/2002 | Borders | |
| 6,449,851 | B1 | 9/2002 | Bone et al. | |
| 6,467,487 | B1 | 10/2002 | Rios | |
| 6,470,520 | B1 | 10/2002 | Weismiller et al. | |
| 6,523,201 | B1 | 2/2003 | De Michele | |
| 6,589,194 | B1 | 7/2003 | Calderon et al. | |
| 6,629,944 | B2 | 10/2003 | Smart | |
| 6,654,974 | B2 | 12/2003 | Ruehl et al. | |
| 6,663,055 | B2 | 12/2003 | Boucher et al. | |
| 6,681,772 | B2 | 1/2004 | Atwater et al. | |
| 6,684,419 | B1 | 2/2004 | Perla | |
| 6,698,044 | B2 | 3/2004 | Greenfield et al. | |
| 6,704,959 | B2 | 3/2004 | Schuerch | |
| 6,739,006 | B2 | 5/2004 | Borders et al. | |
| 6,754,923 | B2 | 6/2004 | Borders et al. | |
| 6,757,924 | B2 | 7/2004 | Goodwin et al. | |
| 6,811,541 | B2 | 11/2004 | Lambert | |
| 6,826,794 | B2 | 12/2004 | Mahoney et al. | |
| 6,854,145 | B2 | 2/2005 | Ruehl et al. | |
| 6,857,153 | B2 | 2/2005 | Ruehl et al. | |
| 6,874,184 | B2 | 4/2005 | Chandler | |
| 6,883,812 | B1 | 4/2005 | Hsieh | |
| 7,073,221 | B2 | 7/2006 | Goodwin et al. | |
| 7,083,180 | B2 | 8/2006 | Turner | |
| 7,115,105 | B2 | 10/2006 | Cropper | |
| D546,462 | S | 7/2007 | Buethorn | |
| 7,243,654 | B2 | 7/2007 | Schuerch | |
| 7,244,238 | B2 | 7/2007 | March et al. | |
| 7,258,676 | B2 | 8/2007 | Calderon et al. | |
| 7,306,206 | B2 | 12/2007 | Turner | |
| 7,322,060 | B2 | 1/2008 | Kirn | |
| D562,812 | S | 2/2008 | Sculler et al. | |
| 7,337,483 | B2 | 3/2008 | Boucher et al. | |
| D566,210 | S | 4/2008 | Kim | |
| 7,410,488 | B2 | 8/2008 | Janna et al. | |
| 7,419,127 | B2 | 9/2008 | Buehler | |
| 7,452,343 | B2 | 11/2008 | Campbell | |
| 7,464,421 | B2 | 12/2008 | Goodwin et al. | |
| 7,469,433 | B2 | 12/2008 | Ruehl et al. | |
| 7,481,751 | B1 | 1/2009 | Arnold | |
| 7,500,646 | B2 | 3/2009 | Chapman | |
| 7,507,215 | B2 | 3/2009 | Ryan | |
| 7,536,734 | B2 | 5/2009 | Heimbrock | |
| 7,546,993 | B1 | 6/2009 | Walker | |
| 7,581,266 | B2 | 9/2009 | Krecow et al. | |
| 7,591,050 | B2 | 9/2009 | Hammerslag | |
| 7,657,953 | B2 | 2/2010 | Reckelhoff et al. | |
| 7,669,259 | B2 | 3/2010 | Ganance et al. | |
| 7,676,868 | B2 | 3/2010 | Reckelhoff | |
| 7,685,659 | B2 | 3/2010 | Heimbrock et al. | |
| 7,686,267 | B2 | 3/2010 | DaSilva | |
| 7,726,617 | B2 | 6/2010 | Zambelli et al. | |
| 7,731,138 | B2 | 6/2010 | Wiesner et al. | |
| RE41,412 | E * | 7/2010 | Van Steenburg .. | A61G 13/0009<br>5/624 |
| 7,757,317 | B2 | 7/2010 | Ganance et al. | |
| 7,823,843 | B2 | 11/2010 | Oberlaender et al. | |
| 7,832,035 | B2 | 11/2010 | Walczyk | |
| 7,832,401 | B2 | 11/2010 | Torrie et al. | |
| 7,861,720 | B1 | 1/2011 | Wolcott | |
| 7,947,006 | B2 | 5/2011 | Torrie et al. | |
| 7,980,521 | B2 | 7/2011 | Harr et al. | |
| 8,028,362 | B1 | 10/2011 | Barreau et al. | |
| 8,048,082 | B1 * | 11/2011 | DeMayo .............. | A61B 17/025<br>606/90 |
| 8,079,101 | B2 | 12/2011 | Reckelhoff et al. | |
| 8,099,807 | B2 | 1/2012 | Heimbrock et al. | |
| 8,117,697 | B2 | 2/2012 | Ganance et al. | |
| 8,133,039 | B2 | 3/2012 | Anderson et al. | |
| D659,839 | S | 5/2012 | Anderson et al. | |
| 8,177,734 | B2 | 5/2012 | Vess | |
| 8,182,469 | B2 | 5/2012 | Anderson et al. | |
| 8,209,801 | B2 | 7/2012 | Shih | |
| 8,246,028 | B2 | 8/2012 | Larkin et al. | |
| 8,256,047 | B2 | 9/2012 | Klemm et al. | |
| 8,308,114 | B2 | 11/2012 | DeBuhr et al. | |
| 8,322,342 | B2 | 12/2012 | Soto et al. | |
| 8,327,480 | B2 | 12/2012 | Ganance et al. | |
| D675,741 | S | 2/2013 | Anderson et al. | |
| 8,387,266 | B2 | 3/2013 | Eddy | |
| 8,388,562 | B2 | 3/2013 | Baker et al. | |
| 8,414,272 | B2 | 4/2013 | Swisher et al. | |
| 8,448,274 | B2 | 5/2013 | Broens | |
| 8,449,483 | B2 | 5/2013 | Eddy | |
| 8,469,033 | B2 | 6/2013 | Gardner et al. | |
| 8,510,882 | B2 | 8/2013 | Campagna et al. | |
| 8,566,984 | B2 | 10/2013 | Paz et al. | |
| 8,607,378 | B2 | 12/2013 | Moriarity et al. | |
| 8,615,827 | B2 | 12/2013 | Newkirk et al. | |
| 8,632,042 | B2 | 1/2014 | Hoel | |
| 8,640,286 | B1 | 2/2014 | Hochman et al. | |
| 8,640,287 | B2 | 2/2014 | Wukusick et al. | |
| 8,640,290 | B1 | 2/2014 | Avett et al. | |
| 8,641,652 | B2 | 2/2014 | Gazayerli | |
| 8,656,917 | B2 | 2/2014 | Gamber et al. | |
| 8,683,631 | B2 | 4/2014 | Bellows et al. | |
| 8,707,486 | B2 | 4/2014 | Chella et al. | |
| 8,806,683 | B2 | 8/2014 | Gauta | |
| 8,840,077 | B2 | 9/2014 | Von Pechmann et al. | |
| 8,856,988 | B2 | 10/2014 | Frazier | |
| 8,875,329 | B2 | 11/2014 | Gomez | |
| 8,960,622 | B2 | 2/2015 | Von Pechmann et al. | |
| 8,990,984 | B2 | 3/2015 | Hochman et al. | |
| 8,997,284 | B2 | 4/2015 | Kreuzer et al. | |
| 8,998,799 | B2 | 4/2015 | Orban, III et al. | |
| 8,998,930 | B2 | 4/2015 | Orban, III | |
| 9,056,042 | B2 | 6/2015 | Russell | |
| 9,107,792 | B2 | 8/2015 | Catacchio et al. | |
| 9,161,819 | B2 | 10/2015 | Magelund et al. | |
| 10,188,573 | B2 | 1/2019 | Moriarty et al. | |
| 11,147,730 | B2 | 10/2021 | Moriarty et al. | |
| 2001/0039680 | A1 * | 11/2001 | Boucher ............ | A61G 13/0072<br>5/623 |
| 2003/0056793 | A1 | 3/2003 | Atwater et al. | |
| 2005/0051977 | A1 | 3/2005 | Yiu Lu | |
| 2006/0225215 | A1 | 10/2006 | Krecow et al. | |
| 2007/0060854 | A1 | 3/2007 | Cropper | |
| 2007/0113345 | A1 | 5/2007 | Reckelhoff | |
| 2008/0163427 | A1 | 7/2008 | Howe | |
| 2009/0211029 | A1 | 8/2009 | Forba | |
| 2010/0071704 | A1 | 3/2010 | Domondon | |
| 2010/0089407 | A1 | 4/2010 | Gardner et al. | |
| 2011/0023893 | A1 | 2/2011 | Striggow et al. | |
| 2011/0112455 | A1 | 5/2011 | Rocklin | |
| 2011/0197362 | A1 | 8/2011 | Chella et al. | |
| 2011/0245743 | A1 | 10/2011 | Eddy | |
| 2011/0252563 | A1 | 10/2011 | Horstman | |

(56) References Cited

U.S. PATENT DOCUMENTS

| | | | | |
|---|---|---|---|---|
| 2012/0137437 | A1 | 6/2012 | Paz et al. | |
| 2012/0233782 | A1 | 9/2012 | Kreuzer et al. | |
| 2012/0253254 | A1 | 10/2012 | Rocklin | |
| 2012/0305006 | A1 | 12/2012 | Keith-Lucas et al. | |
| 2013/0019883 | A1* | 1/2013 | Worm | A61G 13/125 128/882 |
| 2013/0226046 | A1 | 8/2013 | Salazar | |
| 2013/0338553 | A1 | 12/2013 | Eddy | |
| 2014/0012270 | A1 | 1/2014 | Fossez et al. | |
| 2014/0068863 | A1* | 3/2014 | Clark | A61G 13/1245 5/621 |
| 2014/0101851 | A1* | 4/2014 | Schuerch, Jr. | A61G 13/125 5/624 |
| 2014/0137874 | A1 | 5/2014 | O'Reagan | |
| 2014/0243716 | A1 | 8/2014 | Diot et al. | |
| 2014/0276274 | A1 | 9/2014 | Clare et al. | |
| 2014/0371648 | A1 | 12/2014 | DeHeer et al. | |
| 2015/0238380 | A1 | 8/2015 | Kreuzer et al. | |
| 2016/0120726 | A1 | 5/2016 | Moriarty et al. | |
| 2017/0072289 | A1 | 3/2017 | Yeh | |
| 2019/0117490 | A1 | 4/2019 | Moriarty et al. | |

OTHER PUBLICATIONS

Extended European Search Report for Application No. 17192128. 1-1651, dated Dec. 20, 2017; 6 pages.

Notification of Reasons for Rejection; Japanese Patent Application No. 2017-234106, dated Nov. 22, 2018; 11 pages.

Notification of Reasons for Rejection in Japanese Patent Application No. 2017-234106 dated Apr. 26, 2019 with English translation, 5 pages.

* cited by examiner

RELEASABLE SPAR FOR SURGICAL BOOT

This application is a divisional of U.S. application Ser. No. 16/229,247, filed Dec. 21, 2018, now U.S. Pat. No. 11,147,730, which is a divisional of U.S. application Ser. No. 14/880,619, filed Oct. 12, 2015, now U.S. Pat. No. 10,188,573, which claims the benefit, under 35 U.S.C. § 119(e), of U.S. Provisional Application No. 62/075,338 which was filed Nov. 5, 2014 and which is hereby incorporated by reference herein.

BACKGROUND

The present disclosure relates to boot stirrups that couple to a surgical table and support a patient's leg and foot during surgery. More particularly, the present disclosure relates to the mechanisms of boot stirrups that permit movement of the boot stirrups relative to the surgical table.

Boot stirrups are typically configured to support and/or immobilize a patient's foot and leg. A boot stirrup is sometimes needed, for example, during surgery to maintain the patient's foot and leg in a selected position relative to a surgical table. Boot stirrups are used with patients of varying sizes and maintain the patient in a variety of positions. Some known boot stirrups include a lockable joint that allows the boot stirrup to be repositioned relative to the surgical table and/or relative to the patient. Some lockable joints include clamps that require rotation of a handle or knob to open and close the clamp. To reposition such boot stirrups, one hand of a user operates the clamp while the other hand supports and repositions the boot. Additionally, most boot stirrups include a static boot that does not provide for adjustment of the boot size with regard to length or width.

SUMMARY

The present invention may comprise one or more of the features recited in the appended claims and/or the following features which each are considered to be optional and which, alone or in any combination, may comprise patentable subject matter:

A support arm may include a spar, a lockable swivel joint, and a spar handle. The spar may have a proximal end, a distal end spaced apart from the proximal end, and an actuator rod extending between the proximal and distal ends along a longitudinal axis of the support arm. The lockable swivel joint may be coupled to the actuator rod at the proximal end of the spar and coupled to the surgical table. The lockable swivel joint may be configured to permit movement of the spar relative to the surgical table about a plurality of axes. The spar handle may be coupled to the distal end of the spar. The spar handle may include a handle housing coupled to the spar and a spar lever coupled to the actuator rod and configured to move linearly and generally parallel to the longitudinal axis relative to the handle housing to cause the actuator rod to rotate about the longitudinal axis between a first orientation in which the lockable swivel joint is locked and a second orientation in which the lockable swivel joint is unlocked.

In some embodiments, the spar lever may include a lever slide arranged around the actuator rod and a lever handle extending radially away from the lever slide relative to the longitudinal axis. The lever slide may be configured to move with the lever handle and cause the actuator rod to rotate between the first and second orientations when the lever handle is moved linearly and generally parallel to the longitudinal axis.

In some embodiments, the lever slide may include an inner surface, an outer surface radially spaced apart from the inner surface, and a sidewall extending radially through the lever slide between the inner and outer surfaces. The sidewall may be formed to define a slot extending axially and circumferentially along the lever slide. The spar may further include an actuator axle coupled to the actuator rod for movement therewith. The actuator axle may extend into the slot.

In some embodiments, the actuator axle may extend through the actuator rod into the slot. The lever slide may be arranged to move linearly along the longitudinal axis to cause the sidewall to engage the actuator axle and move the actuator axle circumferentially about the longitudinal axis to cause the actuator rod to rotate between the first and second orientations.

In some embodiments, the actuator axle may include a pin and a bearing arranged around the pin. The pin may extend through the actuator rod into the slot. The bearing may be positioned between the pin and the sidewall.

According to this disclosure a boot stirrup for use during surgery may include a support arm having a longitudinal axis, a surgical boot, and a lockable joint. The surgical boot may include a foot support portion formed to support a foot of a patient and a boot handle fixed to the foot support portion. The lockable joint may be coupled to the support arm and coupled to the surgical boot. The lockable joint may be configured to move between an unlocked position in which the lockable joint permits movement of the surgical boot along the longitudinal axis relative to the support arm and rotation of the surgical boot about the longitudinal axis relative to the support arm and a locked position in which the lockable joint blocks movement of the surgical boot along the longitudinal axis relative to the support arm and rotation of the surgical boot about the longitudinal axis relative to the support arm. The lockable joint may include a release lever configured to move relative to the boot handle to unlock the lockable joint.

In some embodiments, the lockable joint may have a lever axis. The release lever may be pivotable about the lever axis between a first orientation in which the release lever is spaced apart from the boot handle and a second orientation in which the release lever is adjacent to the boot handle. In some embodiments, the lockable joint may be in the locked position when the release lever is in the first orientation and may be in the unlocked position when the release lever is in the second orientation.

In some embodiments, the lockable joint may further include an arm clamp arranged around the support arm and a clamp actuator coupled to the arm clamp. The clamp actuator may include a clamp rod and an actuator unit configured to move the clamp rod relative to the arm clamp between a first position in which the clamp rod engages the arm clamp to cause the arm clamp to be in a closed position and a second position in which the clamp rod disengages the arm clamp to cause the arm clamp to be in an open position.

In some embodiments, the lockable joint may include a transverse axis that is generally perpendicular to the longitudinal axis. The clamp rod may extend along the transverse axis.

In some embodiments, the lockable joint may include a transverse axis and a lever axis that is spaced apart from and generally parallel with the transverse axis. The clamp rod may extend along the transverse axis. The release lever may be pivotable about the lever axis.

In some embodiments, the actuator unit may include a spacer assembly. The clamp rod may be coupled to the spacer assembly. The spacer assembly may be movable between an expanded position in which the spacer assembly causes the clamp rod to engage the arm clamp to move the arm clamp to the closed position and a compressed position in which the spacer assembly causes the clamp rod to disengage the arm clamp to move the arm clamp to the open position.

In some embodiments, the actuator unit may further include a first slide plate coupled to the spacer assembly. The first slide plate may be configured to move between a first position in which the first slide plate moves the spacer assembly into the expanded position and a second position in which the first slide plate moves the spacer assembly into the compressed position.

In some embodiments, the first slide plate may include an upper surface, a lower surface spaced apart from the upper surface, and a sidewall extending between the upper and lower surfaces to form a slot having a narrow end and a wide end. A portion of the spacer assembly may extend into the slot and engage the sidewall at the wide end of the slot to cause the spacer assembly to be in the expanded position when the first slide plate is in the in the first position. The portion of the spacer assembly may engage the sidewall at the narrow end of the slot to cause the spacer assembly to be in the compressed position when the first slide plate is in the in the second position.

In some embodiments, the lockable joint may include a transverse axis. The actuator unit may further include a first slide plate. The spacer assembly may include a first spacer, a second spacer, and a bias member. The first and second spacers may be aligned with the transverse axis. The clamp rod may extend through the first and second spacers and may be coupled to the first spacer for movement therewith. The bias member may be configured to bias the first spacer away from the second spacer to cause the first spacer and the clamp rod to move away from the second spacer to cause the clamp rod to engage the arm clamp and move the arm clamp to the closed position when the lockable joint is in the locked position. The first slide plate may be configured to engage the first and second spacers to cause the first spacer and the clamp rod to move toward the second spacer to cause the clamp rod to disengage the arm clamp and move the arm clamp to the open position when the lockable joint is in the unlocked position.

In some embodiments, the release lever may include a grip portion that is pulled toward the boot handle to unlock the lockable joint. In some embodiments, the grip portion may be located beneath the boot handle and may be pulled upwardly toward the boot handle to unlock the lockable joint.

In some embodiments, the boot handle may extend from a sole of the foot support portion. In some embodiments, the boot handle may extend from a heel support region of the surgical boot.

According to this disclosure, a surgical boot may include a foot support portion, a lower leg support portion, and a connector. The connector may be coupled to the foot support portion and may be coupled to the lower leg support portion. The connector may be configured to permit movement of the lower leg support portion relative to the foot support portion to accommodate legs of patients of different sizes.

In some embodiments, the connector may be configured to permit linear movement of the lower leg support portion relative to the foot support portion. In some embodiments, the connector may include a first rail that extends from the foot support portion toward the lower leg support portion and a first track arranged around the first rail.

In some embodiments, the first rail may be formed to include a plurality of indentations spaced apart from one another. The first track may include a pin arranged to extend into at least one of the plurality of indentations to block movement of the lower leg support portion relative to the foot support portion.

In some embodiments, the first rail may include an upper surface and a lower surface spaced apart from the upper surface. The upper surface may be formed to include the plurality of indentations.

In some embodiments, the first rail may be coupled to the foot support portion. The first track may be coupled to the lower leg support portion. The first track may be configured to translate on the first rail to cause the lower leg support portion to move relative to the foot support portion.

In some embodiments, the connector may include a second rail spaced apart from the first rail and a second track arranged around the second rail. The second rail may be coupled to the foot support portion. The second track may be coupled to the lower leg support portion. The second track may be configured to translate on the second rail to cause the lower leg support portion to move relative to the foot support portion. In some embodiments, the lower leg support portion may include a calf portion and a kneepad having a pad insert and a strap that couples the kneepad to the calf portion.

According to the disclosure, a support apparatus for use with a surgical table may include a support arm, a lockable joint, and a surgical boot. The support arm may be coupled to the surgical table. The lockable joint may be coupled to the support arm. The surgical boot may be coupled to the lockable joint for movement of the surgical boot relative to the support arm about a plurality of axes. The surgical boot may include a limb-support surface configured to engage and support a limb of a patient and a mount surface including at least one mount configured to couple to and support an accessory unit.

In some embodiments, the at least one mount may include a plurality of threaded apertures formed in the mount surface and extending into the surgical boot. In some embodiments, the mount surface may be generally flat.

In some embodiments, the surgical boot may be formed to include a notch extending into the surgical boot. The notch may be configured to receive at least one conduit extending between the accessory unit and the limb of the patient.

In some embodiments, the accessory unit may include a sequential compression device. In some embodiments, the sequential compression device may include a pump unit coupled to the mount surface.

In some embodiments, the sequential compression device may include a garment worn on a patient's limb and at least one conduit extending between the garment and the pump unit. In some embodiments, the surgical boot may include a notch to receive the at least one conduit.

Additional features, which alone or in combination with any other feature(s), such as those listed above, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which.

DETAILED DESCRIPTION

Figure 1:
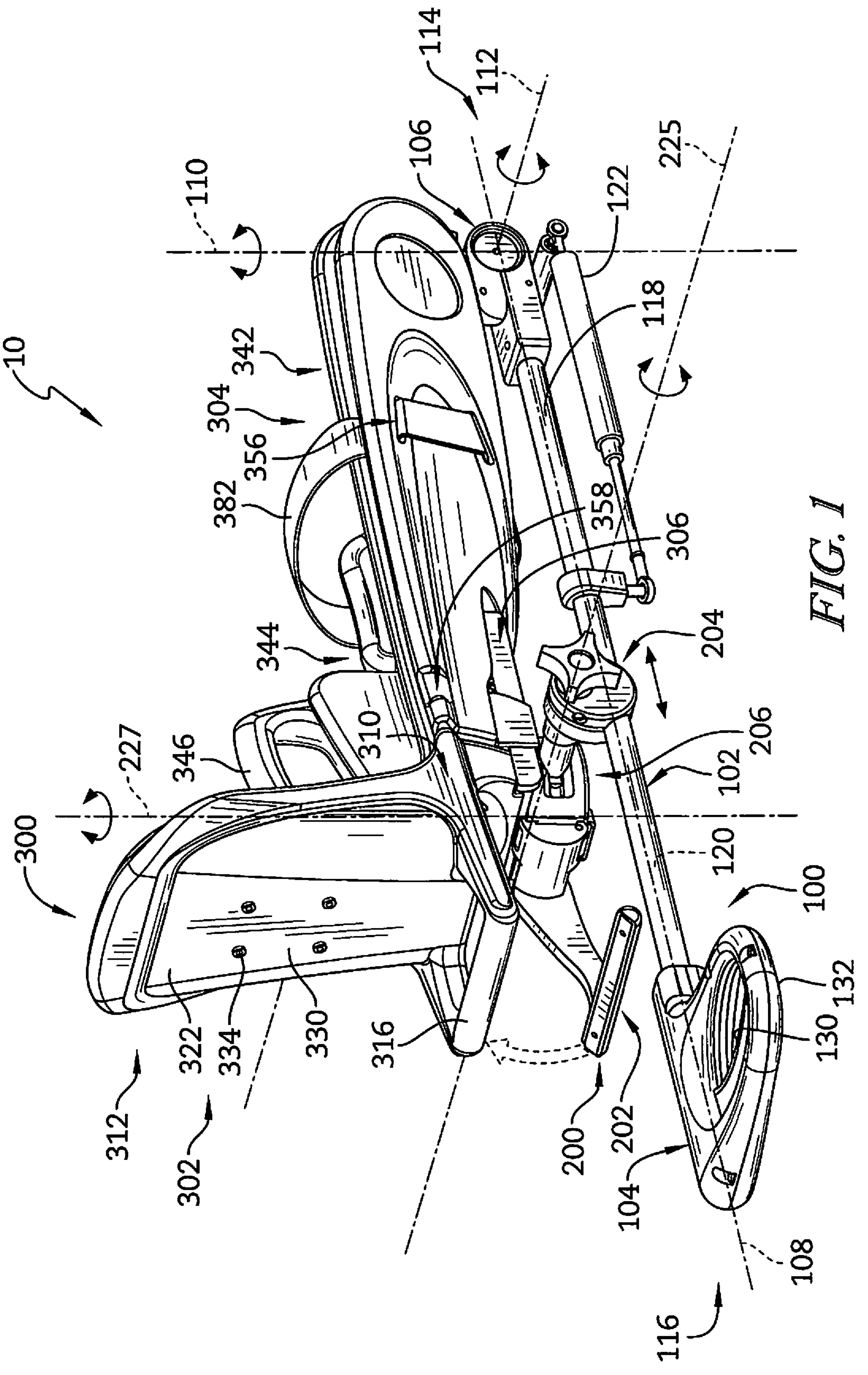
FIG. 1 is a perspective view of a boot stirrup for use with a surgical table, the boot stirrup includes a support arm that is movable about a plurality of axes relative to the surgical table, a surgical boot configured to support and/or immobilize a foot and leg of a patient, and a lockable joint configured to selectively permit movement of the surgical boot relative to the support arm.

An illustrative boot stirrup 10 is shown in FIG. 1. The boot stirrup 10 is configured to support a patient's foot and leg in a plurality of positions. The boot stirrup 10 is of the type that couples to a surgical table and is configured to immobilize the patient's foot and leg during a surgical procedure.

The boot stirrup 10 includes a support arm 100, a surgical boot 300, and a lockable joint 200 coupled to the support arm 100 and coupled to the surgical boot 300 as shown in FIG. 1. The support arm 100 is configured to couple to the surgical table for movement about a plurality of axes relative to the surgical table. The surgical boot 300 is configured to support and/or immobilize the foot and leg of the patient. The lockable joint 200 is configured to selectively permit movement of the surgical boot 300 relative to the support arm 100.

Figure 2:
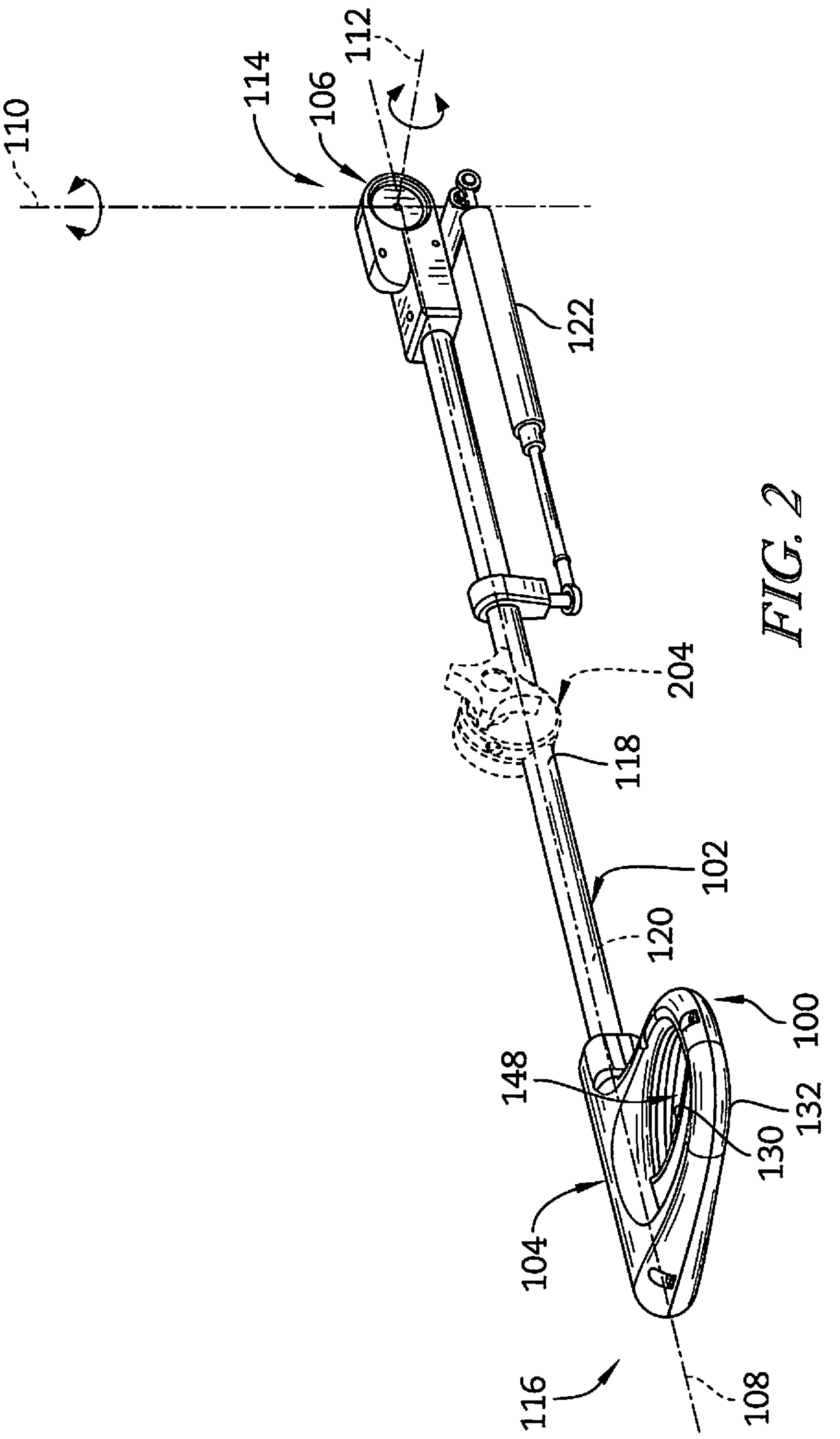
FIG. 2 is a perspective view of the support arm and suggesting that the support arm is movable about the plurality of axes to maintain the surgical boot in a plurality of positions.
Figure 3:
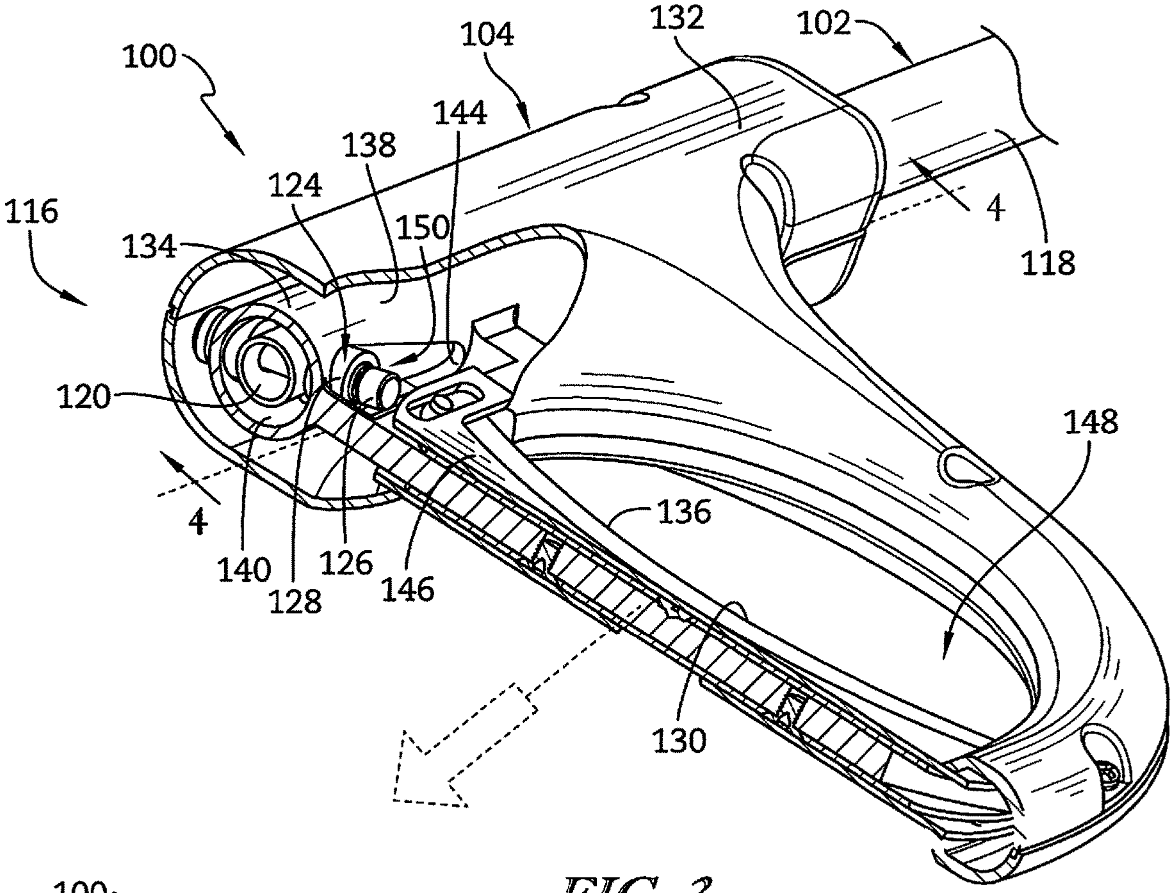
FIG. 3 is a cutaway view of a spar handle included in the support arm and suggesting that a user may squeeze the spar handle in the direction of the dashed arrow to move the support arm between a locked position in which the support arm is blocked from moving and an unlocked position in which the support arm is allowed to move.
Figure 4:
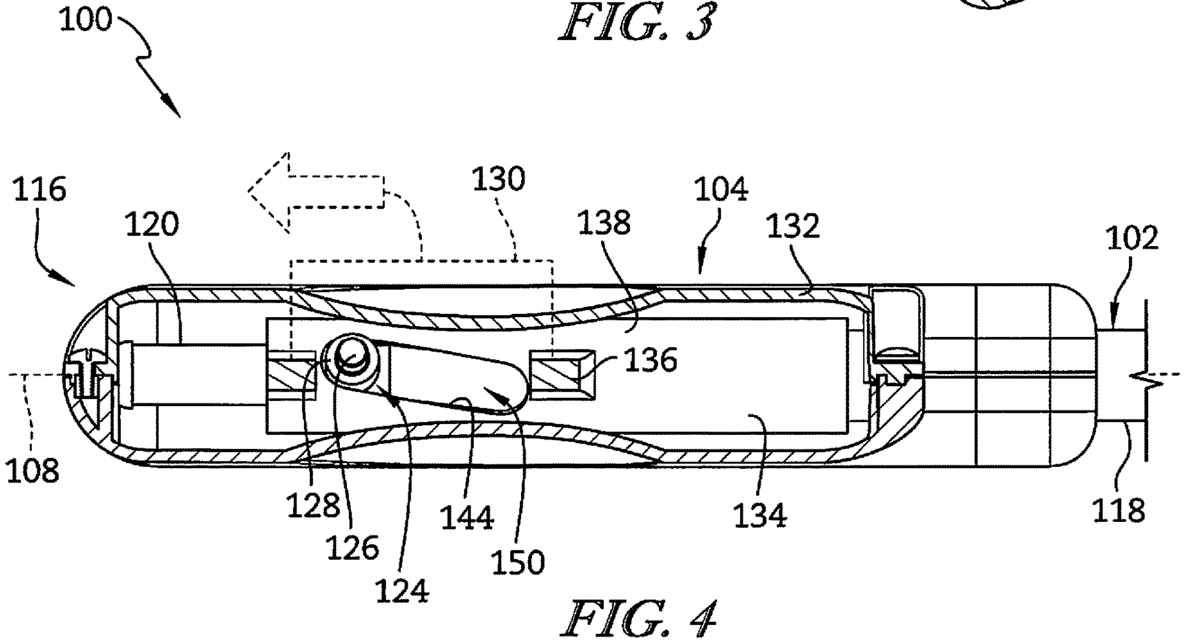
FIG. 4 is a sectional view of the spar handle taken along line 4-4 of FIG. 3.

The support arm 100 includes a spar 102 and a spar handle 104 as shown in FIGS. 2-4. In the illustrative embodiment, the support arm 100 further includes a lockable swivel joint 106 and a longitudinal axis 108. The lockable swivel joint 106 is coupled to the surgical table and coupled to the spar 102. The lockable swivel joint 106 is configured to lock the spar 102 in one of a plurality of positions to block movement of the spar 102. The spar 102 is coupled to the lockable swivel joint 106 and is configured to support the lockable joint 200 and the surgical boot 300 to maintain the patient's foot and leg in a selected position. The spar handle 104 is coupled to the spar 102 and configured to be squeezed and released by a user to lock and unlock the lockable swivel joint 106.

The lockable swivel joint 106 is configured as disclosed in U.S. Pat. No. 6,663,055, granted Dec. 16, 2003, and entitled "ARMBOARD ASSEMBLY," which is hereby incorporated by reference in its entirety for it teachings of the swivel joint construction disclosed therein. The lockable swivel joint 106 includes an abduction axis 110 and a lithotomy axis 112 as shown in FIG. 2. The lockable swivel joint 106 is coupleable to a surgical table and is configured to permit movement of the spar 102 relative to the surgical table about at least the abduction axis 110 and the lithotomy axis 112.

In the illustrative embodiment, the support arm further includes a telescoping strut 122 as shown in FIGS. 1 and 2. The telescoping strut 122 is configured to counteract the weight of the surgical boot and the patient's leg and foot. As such, when the swivel joint 106 is unlocked, the telescoping strut provides a bias force suitable to support a portion of the weight of a patient's leg and foot, thereby assisting a caregiver in reposition the leg and foot of the patient.

The telescoping strut 122 may be a hydraulic or pneumatic cylinder, a linear actuator, or an un-powered strut. In some embodiments, the telescoping strut 122 may be a combination of a hydraulic/pneumatic device. In the illustrative embodiment, the telescoping strut 122 comprises a counterbalance gas spring that is pre-charged with gas to provide positioning assistance.

Illustratively, the telescoping strut 122 is coupled to the lockable swivel joint 106 and coupled to the spar 102. In other embodiments, the telescoping strut 122 may be coupled to a portion of a clamp that mounts to the surgical table and coupled to the spar 102. The telescoping strut 122 illustratively includes an extension tube and an extension rod such as a piston rod, for example. The extension tube is configured such that an inner diameter of the extension tube is slightly larger than an outside diameter of a piston at an end of the extension rod so that the extension rod is telescopically received within the extension tube.

The spar 102 is configured to pivot about the plurality of pivot axes that extend through the lockable swivel joint 106 as suggested in FIG. 2. The spar 102 has a proximal end 114 and a distal end 116 spaced apart from the proximal end 114 along the longitudinal axis 108. The spar 102 includes an actuator rod 118 and a support shaft 120. The actuator rod 118 and the support shaft 120 extend along the longitudinal axis 108 between the proximal end 114 and the distal end 116. The actuator rod 118 is configured to lock and unlock the lockable swivel joint 106. The support shaft 120 is coupled to the lockable joint 200 and configured to support the surgical boot 300.

The actuator rod 118 is coupled to the lockable swivel joint 106 at the proximal end 114 as shown in FIG. 2. The actuator rod 118 is coupled to the spar handle 104 at the distal end 116 as shown in FIGS. 3 and 4. The actuator rod 118 is configured to rotate about the longitudinal axis 108 relative to the lockable swivel joint 106 to lock and unlock the lockable swivel joint 106. Illustratively, the actuator rod 118 is configured to rotate between a first orientation in which the lockable swivel joint 106 is locked and a second orientation in which the lockable swivel joint 106 is unlocked.

The support shaft 120 is coupled to the lockable swivel joint 106 at the proximal end 114 for movement therewith as shown in FIG. 2. The support shaft 120 is coupled to the spar handle 104 at the distal end 116. The lockable joint 200 and, thus, the surgical boot 300 are coupled to the support shaft 120. The support shaft 120 is configured to move with the lockable swivel joint 106 about the abduction axis 110 and the lithotomy axis 112 when the lockable swivel joint 106 is unlocked. The support shaft 120 is blocked from moving about the abduction axis 110 and the lithotomy axis 112 when the lockable swivel joint 106 is locked. As such, the lockable swivel joint 106 may be unlocked by a user to allow the user to move the support shaft 120 about the axes 110, 112 to position generally the surgical boot 300. The lockable swivel joint 106 may then be locked to maintain the support shaft 120 in position. Illustratively, the support shaft 120 is arranged around and extends along the actuator rod 118 as shown in FIG. 4.

In the illustrative embodiment, the spar 102 further includes an actuator axle 124 as shown in FIGS. 3 and 4. The actuator axle 124 is configured to cause the actuator rod 118 to rotate between the first and second orientations when a user squeezes the spar handle 104. The actuator axle 124 includes a pin 126 and bearings 128 arranged around the pin 126.

The pin 126 extends through the actuator rod 118 at the distal end 116 as shown in FIGS. 3 and 4. The pin 126 is coupled with the actuator rod 118 for movement therewith. The pin 126 intersects the longitudinal axis 108 in the illustrative embodiment. Illustratively, the pin 126 extends generally perpendicularly through the actuator rod 118. The bearings 128 are arranged around the pin 126. The bearings 128 are engaged by the spar handle 104 to cause the pin 126 and actuator rod 118 to rotate about the longitudinal axis 108. The bearings 128 rotate about the pin 126 to minimize friction between the actuator axle 124 and the spar handle 104. In other embodiments, the bearings 128 are omitted.

The spar handle 104 is coupled to the distal end 116 of the spar 102 as shown in FIGS. 3 and 4. The spar handle 104 includes a spar lever 130 and a handle housing 132 arranged around the spar lever 130. The handle housing 132 is coupled to the support shaft 120 to provide a handle for the user to grip and manipulate the support arm 100. The spar lever 130 is coupled with the actuator axle 124 and configured to cause the actuator rod 118 to rotate between the first and second orientations when a user squeezes the spar handle 104 and moves the spar lever 130.

The spar lever 130 includes a lever slide 134 and a lever handle 136 as shown in FIGS. 3 and 4. The lever slide 134 is coupled with the actuator axle 124 and configured to move relative to the actuator rod 118 to cause the actuator axle 124 to rotate about the longitudinal axis 108. The lever handle 136 is coupled to the lever slide 134 and arranged to cause the lever slide 134 to move relative to the actuator rod 118 when a user moves the lever handle 136.

The lever slide 134 includes an outer wall 138, an inner wall 140, and a sidewall 144 extending between the outer and inner walls 138, 140 to form a slot 150 as shown in FIGS. 3 and 4. The actuator axle 124 extends through the slot 150. The slot 150 is formed such that, as the lever slide 134 moves relative to the actuator rod 118, the actuator axle 124 engages the sidewall 144. As the lever slide 134 moves, the sidewall 144 applies a force to the actuator axle 124 to cause the actuator axle 124 to rotate circumferentially about the longitudinal axis 108. As such, when the lever slide 134 is moved in a first direction, the lever slide 134 causes the actuator rod 118 to rotate into the first orientation. When the lever slide 134 is moved in a second direction opposite the first direction, the lever slide 134 causes the actuator rod 118 to rotate into the second orientation.

In the illustrative embodiment, the lever slide 134 is cylindrical and arranged around the actuator rod 118 as shown in FIG. 4. The outer wall 138 is a radial outer wall and the inner wall 140 is a radial inner wall. The lever slide 134 includes a first and a second sidewall 144. Each sidewall 144 extends through the lever slide 134 axially and circumferentially relative to the longitudinal axis 108 to form each slot 150. The actuator axle 124 includes two bearings 128 and one bearing is positioned in each slot 150 formed by the sidewalls 144.

The lever slide 134 is configured to move linearly and generally parallel with the longitudinal axis 108 in the illustrative embodiment. As the lever slide 134 moves linearly, the sidewalls 144 apply a circumferential force to the bearings 128 of the actuator axle 124 to cause the actuator rod 118 to rotate about the longitudinal axis 108 between the first and second orientations. The lever slide 134 is biased to cause the lever slide 134 to orient the actuator rod 118 into the first orientation and lock the lockable swivel joint 106.

The lever handle 136 is coupled with the lever slide 134 for movement therewith as shown in FIG. 4. Illustratively, the lever handle 136 extends away from the lever slide 134 and is about orthogonal with the longitudinal axis 108. A portion of the lever handle 136 extends out of the handle housing 132. The lever handle 136 is configured to be gripped by a user and moved generally linearly along a path that is about parallel with the longitudinal axis 108.

The handle housing 132 extends around a portion of the support shaft 120, a portion of the actuator rod 118, the actuator axle 124, the lever slide 134, and a portion of the lever handle 136 as shown in FIGS. 3 and 4. In the illustrative embodiment, the spar handle 104 further includes a pinch guard 146 located between the handle housing 132 and the lever handle 136. The handle housing 132 is formed to include an opening 148. The opening 148 is sized to receive a user's fingers and allow the user to grip the lever handle 136 with their fingers. A portion of the lever handle 136 extends into the opening 148.

In operation, a user grips the spar handle 104 and squeezes the lever handle 136 to overcome the bias force and move the lever handle 136. Movement of the lever handle 136 causes the actuator axle 124 to rotate which causes the actuator rod 118 to rotate into the second orientation. In the second orientation, the lockable swivel joint 106 is unlocked. As such, the user is allowed to pivot the spar 102 about the abduction axis 110 and the lithotomy axis 112. When the support arm 100 is moved into a desired position, the user releases the lever handle 136. The lever handle 136 is biased to move toward the proximal end 114 of the support arm 100. The movement of the lever handle 136 causes the actuator axle 124 to rotate which causes the actuator rod 118 to rotate into the first orientation and lock the lockable swivel joint 106.

The lockable joint 200 is coupled to the support arm 100 and is configured to support the surgical boot 300 in a plurality of positions as suggested in FIG. 1. The lockable joint 200 is configured to move between an unlocked position in which movement of the surgical boot 300 relative to the support arm 100 is allowed and a locked position in which movement of the surgical boot 300 relative to the support arm 100 is restricted. In the unlocked position, the lockable joint 200 permits movement of the surgical boot 300 along the longitudinal axis 108 relative to the support arm 100 and rotation of the surgical boot 300 about the longitudinal axis 108 relative to the support arm 100. In the locked position, the lockable joint 200 blocks movement of the surgical boot 300 along the longitudinal axis 108 relative to the support arm 100 and rotation of the surgical boot 300 about the longitudinal axis 108 relative to the support arm 100.

Figure 6:
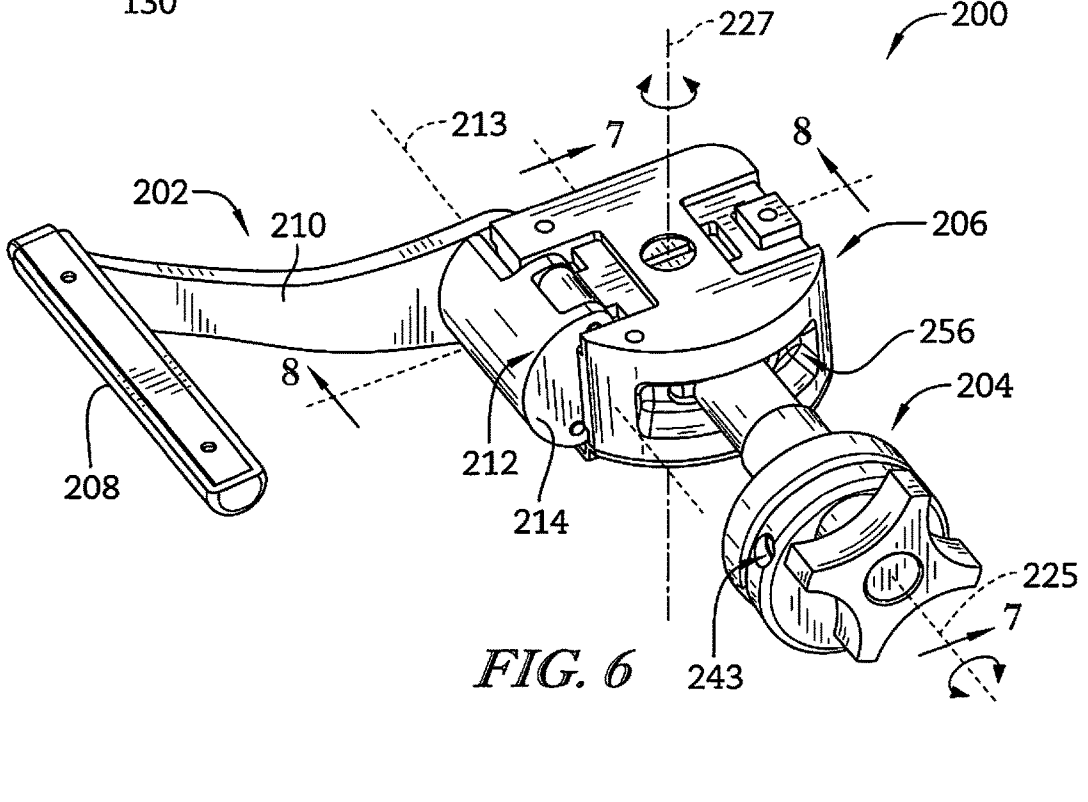
FIG. 6 is a perspective view of the lockable joint of FIG. 5 showing that the lockable joint includes the release lever, an arm clamp, and a clamp actuator.

The lockable joint 200 has a transverse axis 225 and a medial-lateral adjustment axis 227 as shown in FIGS. 1 and 6. The lockable joint 200 is further configured to allow limited movement of the surgical boot 300 about the transverse axis 225 and the medial-lateral adjustment axis 227 when the lockable joint 200 is in either one of the unlocked and the locked positions. In the illustrative embodiment, the lockable joint 200 allows the surgical boot 300 to rotate about 360 degrees around the transverse axis 225. In the illustrative embodiment, the lockable joint 200 allows the surgical boot 300 to pivot about the medial-lateral adjustment axis 227 in a range of about positive 30 degrees and about negative 30 degrees relative to center. Illustratively, the surgical boot 300 is maintained in position relative to the transverse axis 225 and the medial-lateral adjustment axis 227 by friction. A user may apply a force to the surgical boot 300 to overcome the friction to pivot the surgical boot 300 about the transverse axis 225 and/or the medial-lateral adjustment axis 227. When the user releases the surgical boot 300 the frictional forces maintain the surgical boot 300 in the selected position.

The lockable joint 200 includes a release lever 202, an arm clamp 204, and a clamp actuator 206 as shown in FIGS. 6-10. The release lever 202 is configured to be gripped by a user and moved relative to a boot handle 316 included in the surgical boot 300 to unlock the lockable joint 200. The arm clamp 204 is configured to engage the support arm 100 to block movement of the lockable joint 200 when the lockable joint 200 is in the locked position and to disengage the support arm 100 to allow movement of the lockable joint 200 when the lockable joint 200 is in the unlocked position. The clamp actuator 206 is configured to cause the arm clamp 204 to engage and disengage the support arm 100 when the release lever 202 is moved by a user.

Figure 5:
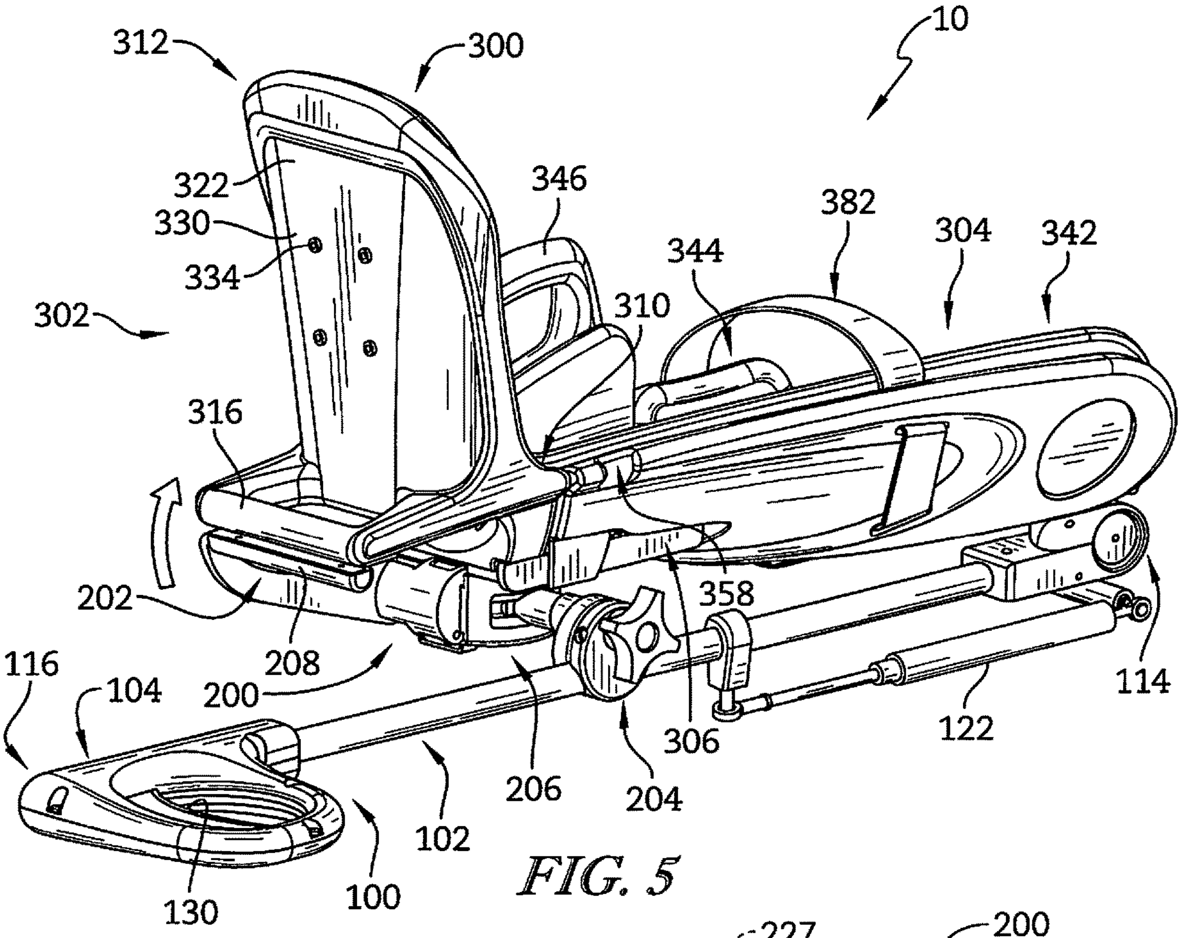
FIG. 5 is a perspective view of the boot stirrup of FIG. 1 showing the support arm, the lockable joint, and the surgical boot showing a release lever of the lockable joint moved upward toward a handle of the surgical boot to unlock the lockable joint.

The release lever 202 has a lever axis 213 and the release lever 202 is pivotable about the lever axis 213 between a first orientation and a second orientation as shown in FIG. 6. In the first orientation, the release lever 202 moves the lockable joint 200 into the locked position as shown in FIG. 1. In the second orientation, the release lever 202 moves the lockable joint 200 into the unlocked position as shown in FIG. 5. In the illustrative embodiment, the lever axis 213 is about parallel with the transverse axis 225. Illustratively, the release lever 202 is spaced apart from the boot handle 316 when the release lever 202 is in the first orientation. The release lever 202 is moved adjacent to the boot handle 316 when the release lever 202 is in the second orientation.

Figure 7:
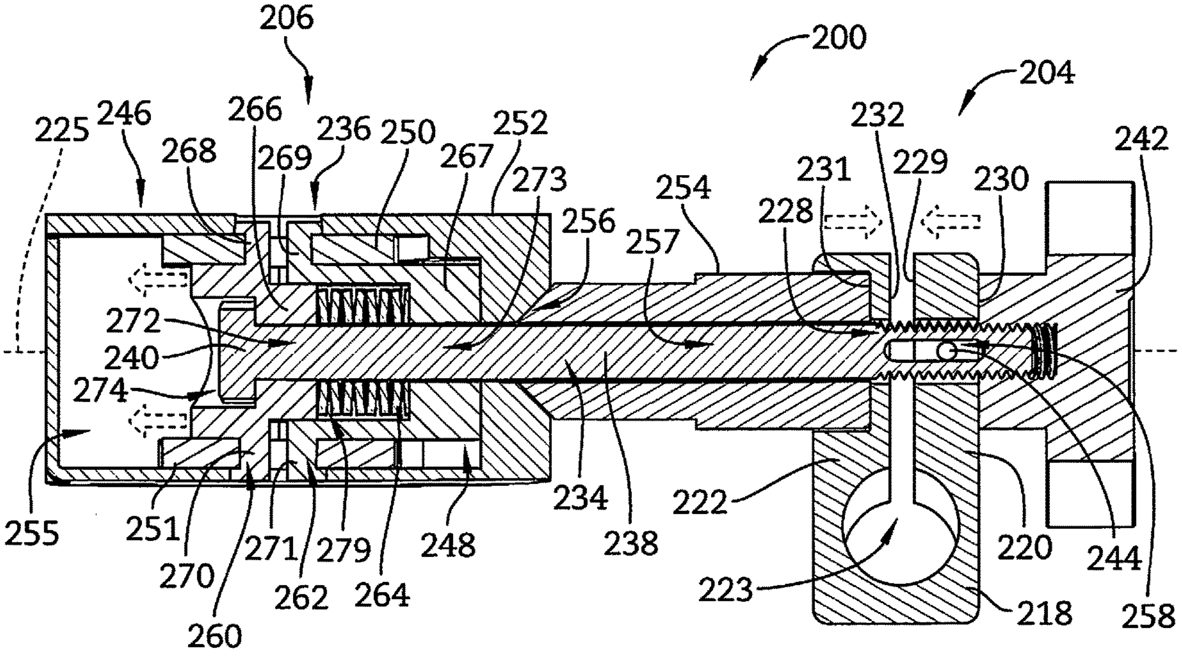
FIG. 7 is a sectional view of the lockable joint taken along line 7-7 of FIG. 6 showing the clamp actuator and the arm clamp and suggesting that the clamp actuator is configured to open and close the arm clamp when the release lever is moved.
Figure 8:
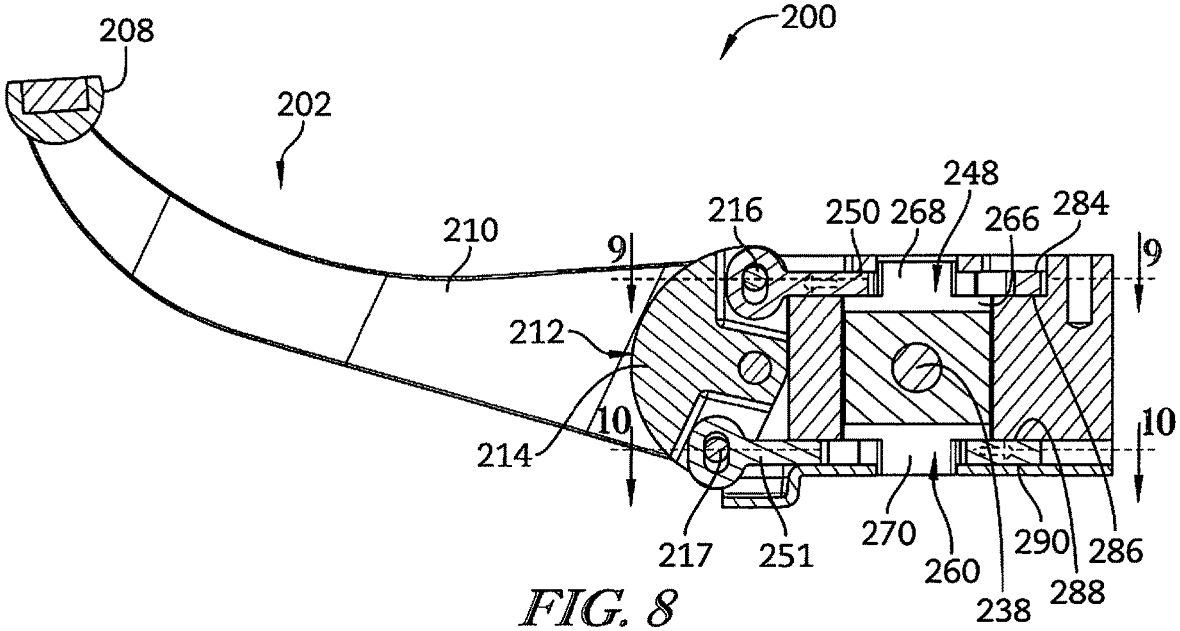
FIG. 8 is sectional view of the lockable joint taken along line 8-8 of FIG. 6 showing the release lever and the clamp actuator and suggesting that the release lever causes the clamp actuator to move when a user pulls up on the release lever.

The release lever 202 includes a grip portion 208, a mount arm 210, and a cam 212 as shown in FIGS. 6-8. The grip portion 208 extends from the mount arm 210 and is configured to be gripped by a user when the user is moving the release lever 202 between the first and second orientations. The mount arm 210 couples the grip portion 208 with the cam 212 to cause the cam 212 to move when the grip portion 208 is moved. The cam 212 is coupled to the clamp actuator 206 to cause the clamp actuator 206 to move when the user moves the release lever 202.

In the illustrative embodiment, the grip portion 208 is pulled toward the boot handle 316 to unlock the lockable joint 200. In other embodiments, the grip portion 208 is pulled toward the boot handle 316 to lock the lockable joint 200. In the illustrative embodiment, the grip portion 208 is located beneath the boot handle 316 and the grip portion 208 is pulled upwardly toward the boot handle 316 to unlock the lockable joint 200. In the illustrative embodiment, the boot handle 316 extends from a heel support region 348 of the surgical boot 300.

The mount arm 210 is coupled to the clamp actuator 206 for rotation about the lever axis 213. Illustratively, the mount arm 210 extends radially away from the lever axis 213 about perpendicular to the lever axis 213. The grip portion 208 is coupled to and extends away from the mount arm 210. Illustratively, the grip portion 208 is about parallel with the lever axis 213.

The cam 212 is coupled to the mount arm 210 for movement therewith as shown in FIG. 8. The cam 212 is coupled to the clamp actuator 206. The cam 212 is configured to pivot about the lever axis 213 with the mount arm 210 to move the clamp actuator 206. The cam 212 includes a cam body 214, an upper pin 216, and a lower pin 217. The cam body 214 is coupled to the mount arm 210 for rotational movement therewith.

The upper pin 216 is coupled to an upper portion of the cam body 214 and to the clamp actuator 206 as shown in FIG. 8. The upper pin 216 is configured to rotate with the cam 212 when then release lever 202 is pulled upwardly to unlock the lockable joint 200. As a result, the upper pin 216 moves away from the grip portion 208 when the release lever 202 is pulled upwardly. The upper pin 216 is configured to rotate toward the grip portion 208 when then release lever 202 is released to lock the lockable joint 200.

The lower pin 217 is coupled to the cam body 214 and to the clamp actuator 206 as shown in FIG. 8. The lower pin 217 is coupled to a lower portion of the cam body 214. The lower pin 217 is configured to rotate when then release lever 202 is pulled upwardly to unlock the lockable joint 200. As a result, the lower pin 217 moves toward the grip portion 208 when the release lever 202 is pulled upwardly. The lower pin 217 is configured to move away from the grip portion 208 when then release lever 202 is released to lock the lockable joint 200.

The arm clamp 204 includes a track 218, an inner shoulder 220, and an outer shoulder 222 as shown in FIG. 7. The track 218 extends around the support arm 100 and is configured to move between an open and closed position to allow and block movement of the lockable joint 200 relative to the longitudinal axis 108. The inner and outer shoulders 220, 222 are configured to be engaged by the clamp actuator 206 to cause the track 218 to move between the open and closed positions. Illustratively, the inner shoulder 220 and the outer shoulder 222 are formed to include a rod passage 228 that extends through the inner and outer shoulders 220, 222. A clamp rod 234 of the clamp actuator 206 extends through the rod passage 228. An end cap 242 coupled to the clamp rod 234 engages the inner sidewall 230 of the inner shoulder 220.

The track 218 is movable between the open position shown in FIG. 7 and the closed position. In the open position, the track 218 disengages the support arm 100 to allow the lockable joint 200 to translate along and rotate about the longitudinal axis 108 relative to the support arm 100. In the closed position, the track 218 engages the support arm 100 to block the lockable joint 200 from translating and rotating about the longitudinal axis 108 relative to the support arm 100.

The track 218 is formed to include an arm passage 223 that extends through the track 218 and receives the support arm 100 as shown in FIGS. 6 and 7. In the illustrative embodiment, the support arm 100 has a circular cross-section when viewed along the longitudinal axis 108. The arm passage 223 forms a circular cavity to allow the track 218 to engage the circumference of the support arm 100. In the open position, the arm passage 223 has a first diameter. In the closed position, the arm passage 223 has a second diameter that is smaller than the first diameter. In other embodiments, the support arm 100 may have a non-circular cross-section such as, for example, a rectangular cross-section. A non-circular cross-section may block the lockable joint 200 from rotating about the longitudinal axis 108.

The inner shoulder 220 is coupled to the track 218 as shown in FIG. 7. The inner shoulder 220 extends upwardly and away from the track 218. The inner shoulder 220 includes an outer sidewall 229, an inner sidewall 230 spaced apart from the outer sidewall 229, and a rod passage 228. The end cap 242 coupled to the clamp rod 234 engages the inner sidewall 230 of the inner shoulder 220.

In the illustrative embodiment, the inner shoulder 220 is formed to include a guide pin passage 243 and a guide pin 244 that extends through the guide pin passage 243 as shown in FIG. 7. The guide pin 244 extends through the guide pin passage 243 and through the rod 238 of the clamp rod 234. The guide pin 244 couples the arm clamp 204 to the clamp rod 234. The guide pin 244 is configured to slide in a pin receiver passage 258 formed in the rod 238.

The outer shoulder 222 is coupled to the track 218 and spaced apart from the inner shoulder 220 as shown in FIG. 7. The outer shoulder 222 extends upwardly and away from the track 218. The outer shoulder 222 includes an outer sidewall 231 and an inner sidewall 232 spaced apart from the outer sidewall 231. An actuator housing 246 of the clamp actuator 206 engages the outer sidewall 231 of the outer shoulder 222.

When the lockable joint 200 is in the locked position, the clamp rod 234 moves away from the inner shoulder 220 toward the outer shoulder 222 as suggested in FIG. 7. The end cap 242 engages the inner sidewall 230 and pushes the inner shoulder 220 toward the outer shoulder 222. The actuator housing 246 engages the outer sidewall 231 of the outer shoulder 222 to block movement of the outer shoulder 222. As such, the outer sidewall 229 moves toward the inner sidewall 232 and the diameter of the arm passage 223 is reduced. The reduced diameter of the arm passage 223 causes the track 218 to move to the closed position and engage the support arm 100 to block movement of the lockable joint 200. As such, the lockable joint 200 is blocked from translating along the support arm 100 and blocked from rotating about the support arm 100.

When the lockable joint 200 is in the unlocked position, the clamp rod 234 moves away from the outer shoulder 222 toward the inner shoulder 220 as shown in FIG. 7. The end cap 242 moves away from the inner sidewall 230 and the inner sidewall 230 is biased away from the outer sidewall 231. As such, the outer sidewall 229 moves away from the inner sidewall 232 and the diameter of the arm passage 223 is increased. The increased diameter of the arm passage 223 causes the track 218 to move to the open position and disengage the support arm 100 to allow movement of the lockable joint 200 about the longitudinal axis 108 relative to the support arm 100. As such, the lockable joint 200 is allowed to translate along the support arm 100 and allowed to rotate about the support arm 100.

The clamp actuator 206 includes the clamp rod 234 and an actuator unit 236 as shown in FIGS. 7-10. The clamp rod 234 is coupled to the actuator unit 236 and is configured to engage the arm clamp 204 to move the arm clamp 204 between the open and closed positions. The actuator unit 236 is configured to move the clamp rod 234 when a user moves the release lever 202.

The clamp rod 234 includes a rod 238 and the end cap 242 as shown in FIG. 7. The rod 238 has an inner end and an outer end spaced apart from the inner end. In the illustrative embodiment, the rod 238 extends along the transverse axis 225. The inner end is threaded and coupled to the end cap 242. The outer end includes a head that engages the actuator unit 236 to couple the clamp rod 234 to the actuator unit 236. The rod 238 extends through the rod passages 228 formed in the inner and outer shoulders 220, 222. The rod 238 illustratively is formed to include the pin receiver passage 258. The pin receiver passage 258 extends along the transverse axis 225.

The end cap 242 is threaded onto the inner end of the rod 238 for movement therewith as shown in FIG. 7. As such, the end cap 242 moves along the transverse axis 225 with the rod 238 when actuator unit 236 moves the rod 238. The end cap 242 engages the inner sidewall 230 of the inner shoulder 220 and blocks movement of the inner shoulder 220 when the lockable joint 200 is locked. The rod 238 moves the end cap 242 away from the inner shoulder 220 and allows movement of the inner shoulder 220 when the lockable joint 200 is unlocked. The end cap 242 may be rotated about the transverse axis 225 relative to the rod 238 to further adjust a clamping force applied to the arm clamp 204 and, thus, the support arm 100.

Illustratively, the actuator unit 236 includes an actuator housing 246, a spacer assembly 248, a first slide plate 250, and a second slide plate 251 as shown in FIGS. 6-10. The actuator housing 246 couples the release lever 202 to the clamp actuator 206 and couples the lockable joint 200 to the surgical boot 300. The spacer assembly 248 is moveable to cause the clamp rod 234 to move along the transverse axis 225 to open and close the arm clamp 204. The first and second slide plates 250, 251 couple the release lever 202 with the spacer assembly 248 to cause the spacer assembly 248 to move when a user pulls the release lever 202.

The actuator housing 246 is arranged around the spacer assembly 248, the first slide plate 250, the second slide plate 251, the clamp rod 234, and the cam 212 as shown in FIG. 7. The actuator housing 246 includes a housing body 252 and a pivot arm 254. The housing body 252 couples the surgical boot 300 with the lockable joint 200. The housing body 252 is pivotably coupled to the pivot arm 254 to allow the housing body 252 and the surgical boot 300 to pivot about the medial-lateral adjustment axis 227 relative to the pivot arm 254. In the illustrative embodiment, the housing body 252 resists movement relative to the pivot arm 254 due to a friction force applied between the housing body 252 and the pivot arm 254.

The housing body 252 is formed to include a chamber 255 and a pivot slot 256 as shown in FIG. 7. The chamber 255 receives the spacer assembly 248, the first slide plate 250, the second slide plate 251, the clamp rod 234, and the cam 212. A portion of the rod 238 extends through the pivot slot 256 into the chamber 255. In the illustrative embodiment, the pivot slot 256 is formed to allow the housing body 252 and, thus, the surgical boot 300 to pivot about medial-lateral adjustment axis 227 relative to the pivot arm 254 and, thus, the support arm 100. The pivot slot 256 is formed to allow the housing body 252 and, thus, the surgical boot 300 to pivot about the transverse axis 225 relative to the pivot arm 254 and, thus, the support arm 100.

The pivot arm 254 is formed to include a rod passage 257 that receives the rod 238 as shown in FIG. 7. The pivot arm 254 engages the housing body 252 at a first end of the pivot arm 254 and engages the arm clamp 204 at a second end of the pivot arm 254. In the illustrative embodiment, a friction force produced between the housing body 252, the pivot arm 254, and the arm clamp 204 blocks the housing body 252 and, thus, the surgical boot 300 from pivoting about the transverse axis 225 and the medial-lateral adjustment axis 227. In some embodiments, the friction force may be greater when the lockable joint 200 is locked. The friction force between the housing body 252, the pivot arm 254, and the arm clamp 204 may be reduced when the lockable joint 200 is unlocked.

The spacer assembly 248 is coupled to the first and second slide plates 250, 251 and the clamp rod 234 as shown in FIGS. 7 and 8. The spacer assembly 248 is moveable between an expanded position in which the spacer assembly 248 causes the clamp rod 234 to engage the arm clamp 204 to move the arm clamp 204 to the closed position and a compressed position in which the spacer assembly 248 causes the clamp rod 234 to disengage the arm clamp 204 to move the arm clamp 204 to the open position.

The spacer assembly 248 includes a first spacer 260, a second spacer 262, and a bias member 264 as shown in FIG. 7. The first spacer 260 is configured to move the rod 238 along the transverse axis 225 when the release lever 202 is pulled. The second spacer 262 is configured to support the rod 238 and the bias member 264. The bias member 264 is configured to bias the first spacer 260 away from the second spacer 262 to move the rod 238 and cause the arm clamp 204 to close when the release lever 202 is released.

The first spacer 260 is coupled with the rod 238 for movement therewith as shown in FIG. 7. The first spacer 260 includes a spacer body 266, an upper shoulder 268, a lower should 270, a rod receiving passage 272, and a rod retainer chamber 274. The spacer body 266 couples the first spacer 260 with the second spacer 262 and the bias member 264. The upper shoulder 268 engages a first ramp surface 276 included in the first slide plate 250 to cause the first spacer 260 to move along the first ramp surface 276 when the first slide plate 250 is moved. The lower shoulder 270 engages a second ramp surface 278 included in the second slide plate 251 to cause the first spacer 260 to move along the second ramp surface 278 when the second slide plate 251 is moved. The rod receiving passage 272 receives a portion of the rod 238. The rod retainer chamber 274 receives a rod head 240 of the clamp rod 234 to cause the clamp rod 234 to move with the first spacer 260.

The spacer body 266 extends into a chamber 279 formed in the second spacer 262 to block the bias member 264 from escaping the chamber 279 as shown in FIG. 7. As such, the bias member 264 applies a bias force to the spacer body 266 and the second spacer 262 to cause the first spacer 260 to be biased away from the second spacer 262. In the illustrative embodiment, the bias force is applied along the transverse axis 225.

The spacer body 266 is formed to include the rod receiving passage 272 and the rod retainer chamber 274 as shown in FIG. 7. The rod receiving passage 272 extends into the spacer body 266 away from the second spacer 262 along the transverse axis 225. The rod receiving passage 272 extends into the spacer body 266 toward the second spacer 262 along the transverse axis 225. The rod receiving passage 272 opens into the rod retainer chamber 274. A portion of the rod 238 extends through the rod receiving passage 272. The rod head 240 is located in the rod retainer chamber 274 and engages the spacer body 266 as shown in FIG. 7. In the illustrative embodiment, the rod head 240 has a circular cross-section when viewed along the transverse axis 225. In other embodiments, the rod head 240 has a non-circular cross-section when viewed along the transverse axis 225. The spacer body 266 may engage the non-circular rod head 240 to block rotation of the rod head 240 about the transverse axis 225.

The upper shoulder 268 extends upwardly from the spacer body 266 away from the second slide plate 251 into the triangular aperture 280 formed in the first slide plate 250 as shown in FIG. 7. The bias member 264 biases the upper shoulder 268 into engagement with the first ramp surface 276 of the first slide plate 250. When the first slide plate 250 moves, the upper shoulder 268 slides along the first ramp surface 276. The first ramp surface 276 is contoured to allow the upper shoulder 268 and, thus, the first spacer 260 to move along the transverse axis 225. When the lockable joint 200 is in the locked position, the first spacer 260 moves away from the second spacer 262. When the lockable joint 200 is in the unlocked position, the upper shoulder 268 is pushed toward the second spacer 262 by the ramp surface 276. In the illustrative embodiment, the upper shoulder 268 is curved. Illustratively, the upper shoulder 268 has a semi-circular shape. The semi-circular shape allows the first spacer 260 to pivot about the medial-lateral adjustment axis 227 while maintaining contact with the ramp surface 276.

The lower shoulder 270 extends downwardly from the spacer body 266 away from the first slide plate 250 into the triangular aperture 282 formed in the second slide plate 251 as shown in FIG. 7. The bias member 264 biases the lower shoulder 270 into engagement with the ramp surface 278 of the second slide plate 251. When the second slide plate 251 moves, the lower shoulder 270 slides along the ramp surface 278. The ramp surface 278 is contoured to allow the lower shoulder 270 and, thus, the first spacer 260 to move along the transverse axis 225. When the lockable joint 200 is in the locked position, the first spacer 260 moves away from the second spacer 262. When the lockable joint 200 is in the unlocked position, the lower shoulder 270 is pushed toward the second spacer 262 by the ramp surface 278. In the illustrative embodiment, the lower shoulder 270 is curved. Illustratively, the lower shoulder 270 has a semi-circular shape. The semi-circular shape allows the first spacer 260 to pivot about the medial-lateral adjustment axis 227 while maintaining contact with the ramp surface 276.

The second spacer 262 includes a spacer body 267, an upper shoulder 269, a lower should 271, and a rod receiving passage 273. The spacer body 267 couples the second spacer 262 with the first spacer 260 and the bias member 264. The upper shoulder 269 engages a first ramp surface 276 included in the first slide plate 250 to cause the second spacer 262 to move along the first ramp surface 276 when the first slide plate 250 is moved. The lower shoulder 271 engages a second ramp surface 278 included in the second slide plate 251 to cause the second spacer 262 to move along the second ramp surface 278 when the second slide plate 251 is moved. The rod receiving passage 272 receives a portion of the rod 238.

The spacer body 267 is formed to include the chamber 279 that receives the bias member 264 as shown in FIG. 7. The bias member 264 applies a bias force to the spacer body 267 and the first spacer 260 to cause the first spacer 260 to be biased away from the second spacer 262. In the illustrative embodiment, the bias force is applied along the transverse axis 225.

The spacer body 267 is formed to include the rod receiving passage 273 as shown in FIG. 7. The rod receiving passage 273 extends into the spacer body 267 and opens into the chamber 279. A portion of the rod 238 extends through the rod receiving passage 273 and through the bias member 264.

The upper shoulder 269 extends upwardly from the spacer body 267 away from the second slide plate 251 into the triangular aperture 280 formed in the first slide plate 250 as shown in FIG. 7. The bias member 264 biases the upper shoulder 269 into engagement with the first ramp surface 276 of the first slide plate 250. When the first slide plate 250 moves, the upper shoulder 269 slides along the first ramp surface 276. The first ramp surface 276 is contoured to allow the upper shoulder 269 and, thus, the second spacer 262 to move along the transverse axis 225. When the lockable joint 200 is in the locked position, the second spacer 262 moves away from the first spacer 260. When the lockable joint 200 is in the unlocked position, the upper shoulder 269 is pushed toward the first spacer 260 by the ramp surface 276. In the illustrative embodiment, the upper shoulder 269 is curved. Illustratively, the upper shoulder 269 has a semi-circular shape. The semi-circular shape allows the second spacer 262 to pivot about the medial-lateral adjustment axis 227 while maintaining contact with the first ramp surface 276.

The lower shoulder 271 extends downwardly from the spacer body 267 away from the first slide plate 250 into the triangular aperture 282 formed in the second slide plate 251 as shown in FIG. 7. The bias member 264 biases the lower shoulder 271 into engagement with the ramp surface 278 of the second slide plate 251. When the second slide plate 251 moves, the lower shoulder 271 slides along the ramp surface 278. The ramp surface 278 is contoured to allow the lower shoulder 271 and, thus, the second spacer 262 to move along the transverse axis 225.

When the lockable joint 200 is in the locked position, the second spacer 262 moves away from the first spacer 260. When the lockable joint 200 is in the unlocked position, the lower shoulder 271 is pushed toward the first spacer 260 by the ramp surface 278. In the illustrative embodiment, the lower shoulder 271 is curved. Illustratively, the lower shoulder 271 has a semi-circular shape. The semi-circular shape allows the second spacer 262 to pivot about the medial-lateral adjustment axis 227 while maintaining contact with the first ramp surface 276.

In the illustrative embodiment, the bias member 264 comprises a plurality of spring washers such as, for example, Belleville washers. Illustratively the Belleville washers are stacked one after the other and are aligned with the transverse axis 225. In other embodiments, the bias member 264 may be a compression spring or any other suitable alternative.

Figure 9:
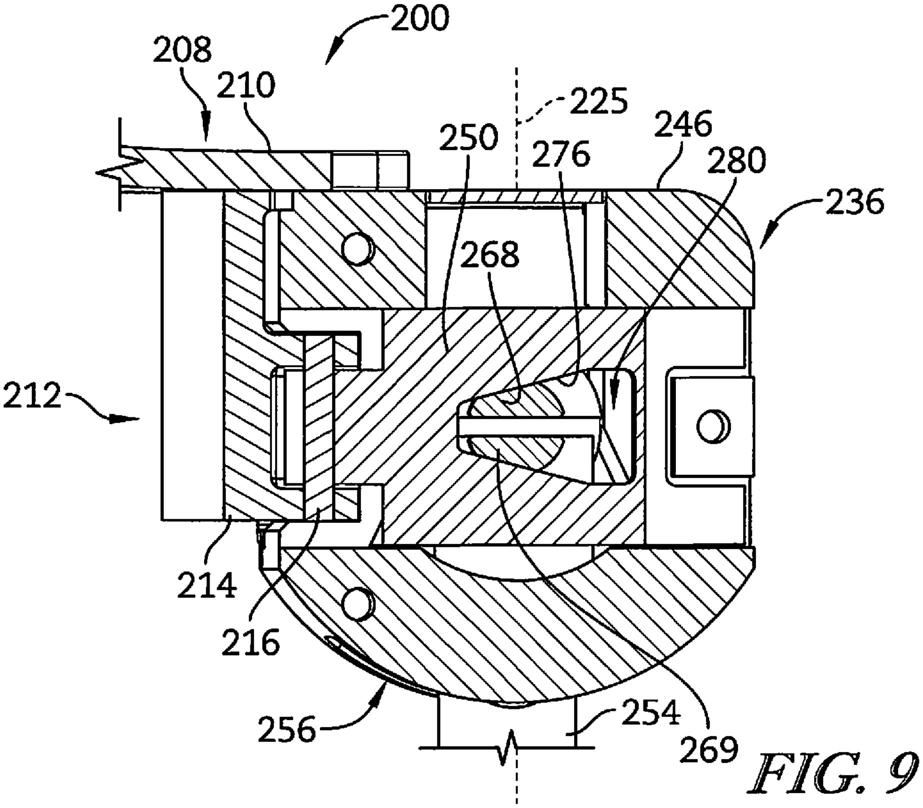
FIG. 9 is sectional view of the lockable joint of FIG. 6 showing a first slide plate included in the clamp actuator and the first slide plate configured to slide back and forth to unlock the arm clamp when a user pulls on the release lever.
Figure 10:
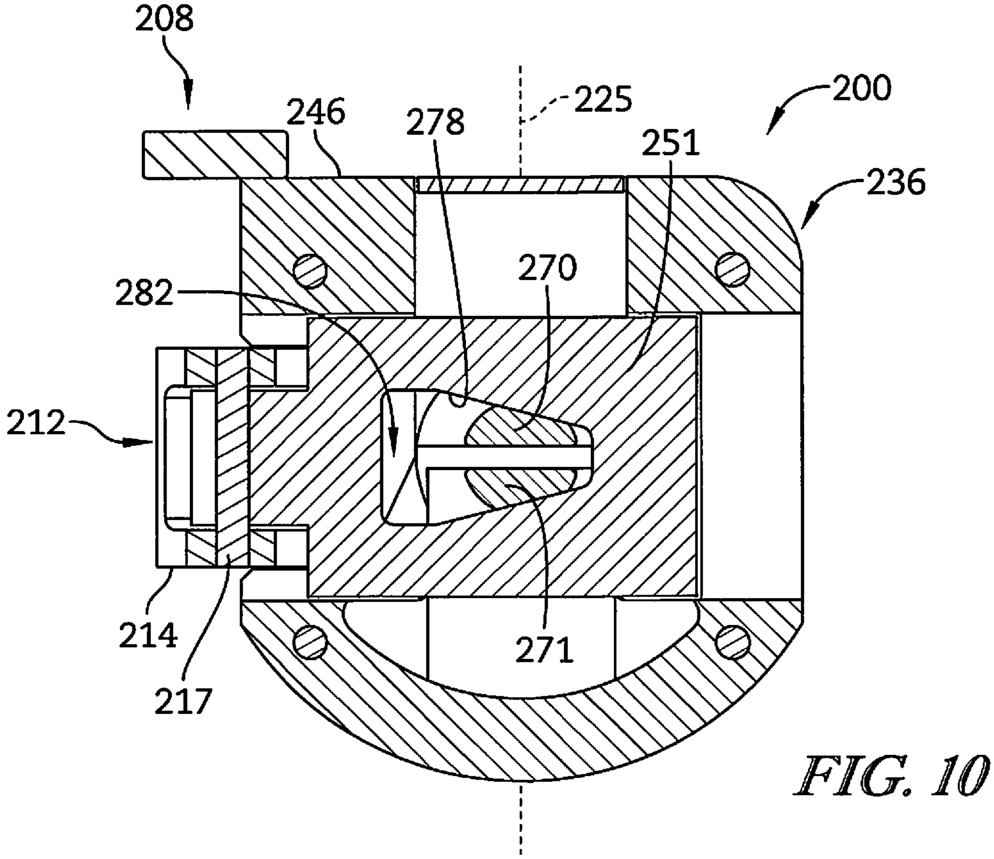
FIG. 10 is sectional view of the lockable joint of FIG. 6 showing a second slide plate included in the clamp actuator and the second slide plate configured to slide back and forth to unlock the arm clamp when a user pulls on the release lever.

The first slide plate 250 is configured to move the spacer assembly 248 between the expanded position and the compressed position when the release lever 202 is pulled upwardly and released as suggested in FIGS. 8-10. The first slide plate 250 is formed to include the triangular aperture 280 as shown in FIG. 6. The first slide plate 250 includes an upper surface 284, a lower surface 286 spaced apart from the upper surface 284, and the ramp surface 276 extending between the upper and lower surfaces 284, 286 to form the triangular aperture 280.

The first slide plate 250 is coupled with the upper pin 216 of the cam 212. As such, the first slide plate 250 is configured to slide toward the grip portion 208 when upper pin 216 pivots about the lever axis 213 toward the grip portion 208 and to slide away from the grip portion 208 when the upper pin 216 pivots away from the grip portion 208.

The triangular aperture 280 comprises a wide end and a narrow end as shown in FIG. 9. When lockable joint 200 is in the unlocked position, the first slide plate 250 is moved to cause the upper shoulders 268, 269 to engage the ramp surface 276 near the narrow end as shown in FIG. 9. At the narrow end, the ramp surface 276 pushes on the upper shoulders 268, 269 to overcome the bias force and move the first spacer 260 toward the second spacer 262. As such, the spacer assembly 248 is moved into the compressed position. When lockable joint 200 is in the locked position, the first slide plate 250 is moved to cause the upper shoulders 268, 269 to engage the ramp surface 276 near the wide end. At the wide end, the bias force pushes the upper shoulders 268, 269 away from each other to move the first spacer 260 away from the second spacer 262. As such, the spacer assembly 248 is moved into the expanded position.

The second slide plate 251 is configured to move the spacer assembly 248 between the expanded position and the compressed position when the release lever 202 is pulled upwardly and released as suggested in FIGS. 8-10. The second slide plate 251 is formed to include the triangular aperture 282 as shown in FIG. 9. The second slide plate 251 includes an upper surface 288, a lower surface 290 spaced apart from the upper surface 288, and the ramp surface 278 extending between the upper and lower surfaces 288, 290 to form the triangular aperture 282.

The second slide plate 251 is coupled with the lower pin 217 of the cam 212. As such, the second slide plate 251 is configured to slide away from the grip portion 208 when lower pin 217 pivots about the lever axis 213 away from the grip portion 208 and to slide toward the grip portion 208 when the lower pin 217 pivots toward the grip portion 208.

The triangular aperture 282 comprises a wide end and a narrow end as shown in FIG. 10. When lockable joint 200 is in the unlocked position, the second slide plate 251 is moved to cause the lower shoulders 270, 271 to engage the ramp surface 278 near the narrow end as shown in FIG. 10. At the narrow end, the ramp surface 278 pushes on the lower shoulders 270, 271 to overcome the bias force and move the first spacer 260 toward the second spacer 262. As such, the spacer assembly 248 is moved into the compressed position. When lockable joint 200 is in the locked position, the second slide plate 251 is moved to cause the lower shoulders 270, 271 to engage the ramp surface 278 near the wide end. At the wide end, the bias force pushes the lower shoulders 270, 271 away from each other to move the first spacer 260 away from the second spacer 262. As such, the spacer assembly 248 is moved into the expanded position.

In operation, a user pulls up on the grip portion 208 to cause the cam 212 to rotate about the lever axis 213. The upper pin 216 pivots away from the grip portion 208 to cause the first slide plate 250 to move away from the grip portion 208. As the first slide plate 250 moves, the first and second spacers 260, 262 are biased toward each other as they move out of the wide end and into the narrow end of the triangular aperture 280. The lower pin 217 pivots toward the grip portion 208 to cause the second slide plate 251 to move toward the grip portion 208. As the second slide plate 251 moves, the first and second spacers 260, 262 are biased toward each other as they move out of the wide end and into the narrow end of the triangular aperture 282.

Movement of the spacers 260, 262 cause the spacer assembly 248 to move to the compressed position. In the compressed position, the first spacer 260 moves the rod 238 toward the arm clamp 204. The end cap 242 moves away from the inner shoulder 220 to allow the arm passage 223 to expand and disengage the support arm 100. As such, the lockable joint 200 is moved to the unlocked position and the user may move the surgical boot 300 relative to the support arm 100.

When the user releases the release lever 202, the bias member 264 applies a bias force to the first and second spacers 260, 262. The bias force causes the first spacer 260 to move away from the second spacer 262 and causes the rod 238 to move away from the arm clamp 204. The end cap 242 engages the inner shoulder 220 to cause the arm clamp 204 to close and lock the lockable joint 200.

As the first spacer 260 moves away from the second spacer 262, the spacers 260, 262 engage ramp surfaces 276, 278 and move the slide plates 250, 251 to cause the spacers 260, 262 to move into the wide end of the apertures 280, 282. Movement of the slide plates 250, 251 causes the upper and lower pins 216, 217 and, thus, the cam 212 to rotate. As the cam 212 rotates, the mount arm 210 moves the grip portion 208 away from the boot handle 316.

Figure 11:
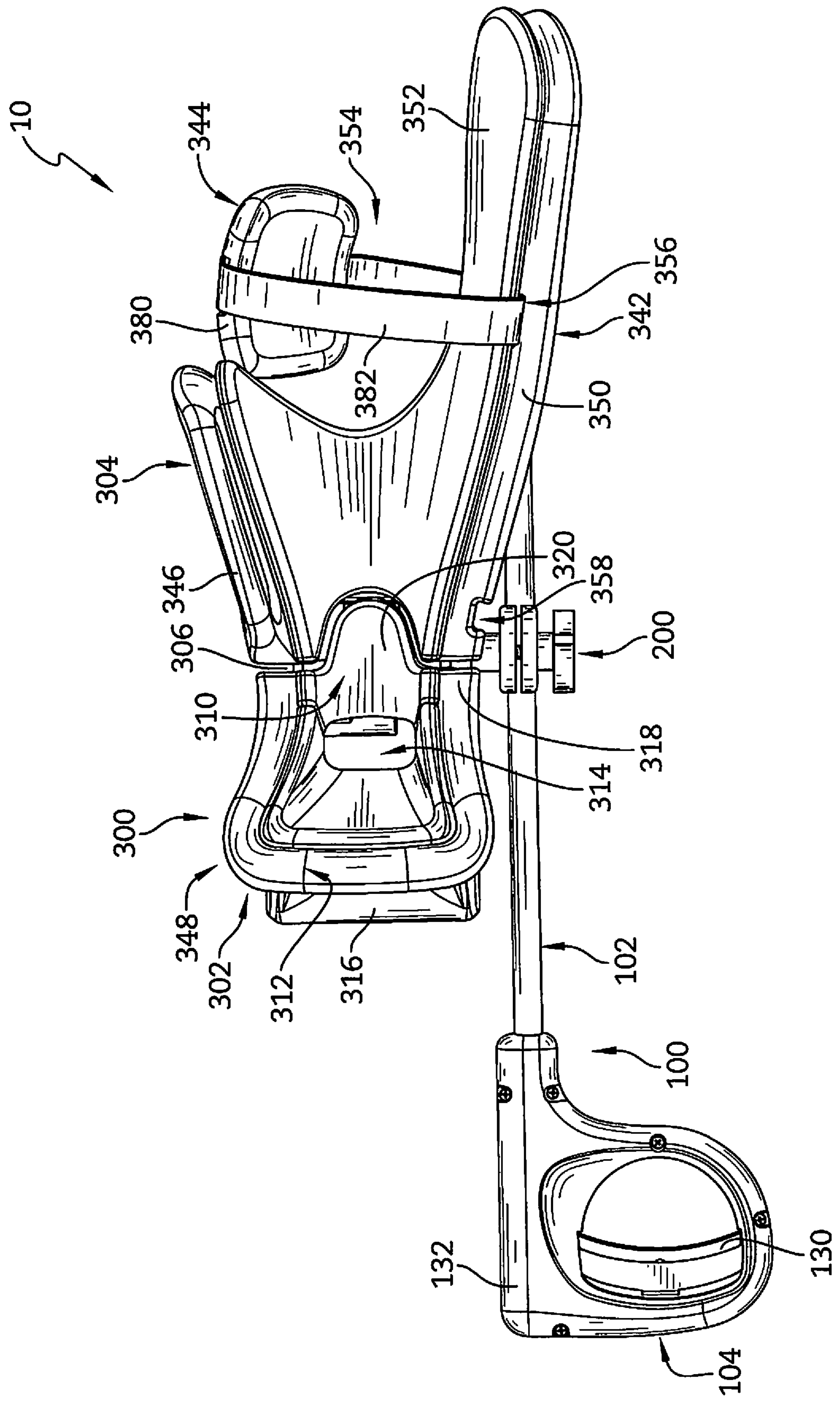
FIG. 11 is a top view of the boot stirrup of FIG. 1 showing that the surgical boot includes a foot support portion and a lower leg support portion spaced apart from the foot support portion and configured to move relative to the foot support to receive legs of varying sizes.

The surgical boot 300 is configured to support and/or immobilize the foot and leg of the patient as suggested in FIGS. 1 and 11-19. The surgical boot 300 is coupled to the lockable joint 200 for movement along and about the longitudinal axis 108, the transverse axis 225, and the medial-lateral adjustment axis 227. The surgical boot 300 includes a foot support portion 302, a lower leg support portion 304, and a connector 306 coupled to the foot support portion 302 and coupled to the lower leg support portion 304 as shown in FIG. 11. The foot support portion 302 is configured to support and/or immobilize the patient's foot. The lower leg support portion 304 is configured to support and/or immobilize the patient's leg. The connector 306 is configured to allow linear movement of the lower leg support portion 304 relative to the foot support portion 302. The boot handle 316 is arranged to be gripped by a user to move the surgical boot 300 and, thus, the patient's leg.

Figure 15:
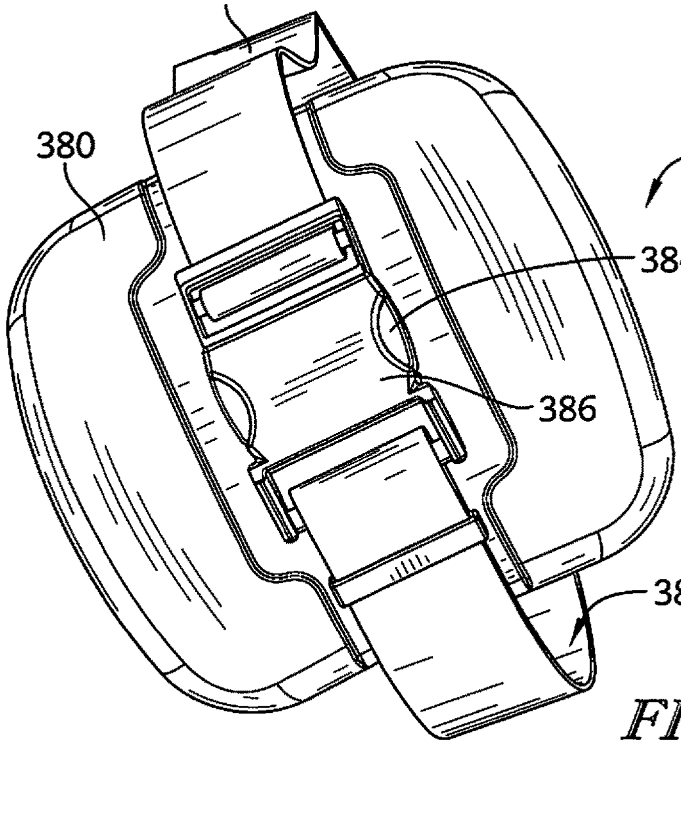
FIG. 15 is a perspective view of the kneepad of FIG. 14 where the strap has been locked to secure a knee of the patient to the surgical boot.

The lower foot support portion 302 includes an ankle portion 310, a sole portion 312, a heel receiving passage 314, and the boot handle 316 as shown in FIGS. 11 and 15. The ankle portion 310 supports a patient's ankle and couples the lower foot support portion 302 to the lockable joint 200. The sole portion 312 supports a patient's sole and is spaced apart from the ankle portion 310 to form the heel receiving passage 314 for receiving a patient's heel.

Figure 16:
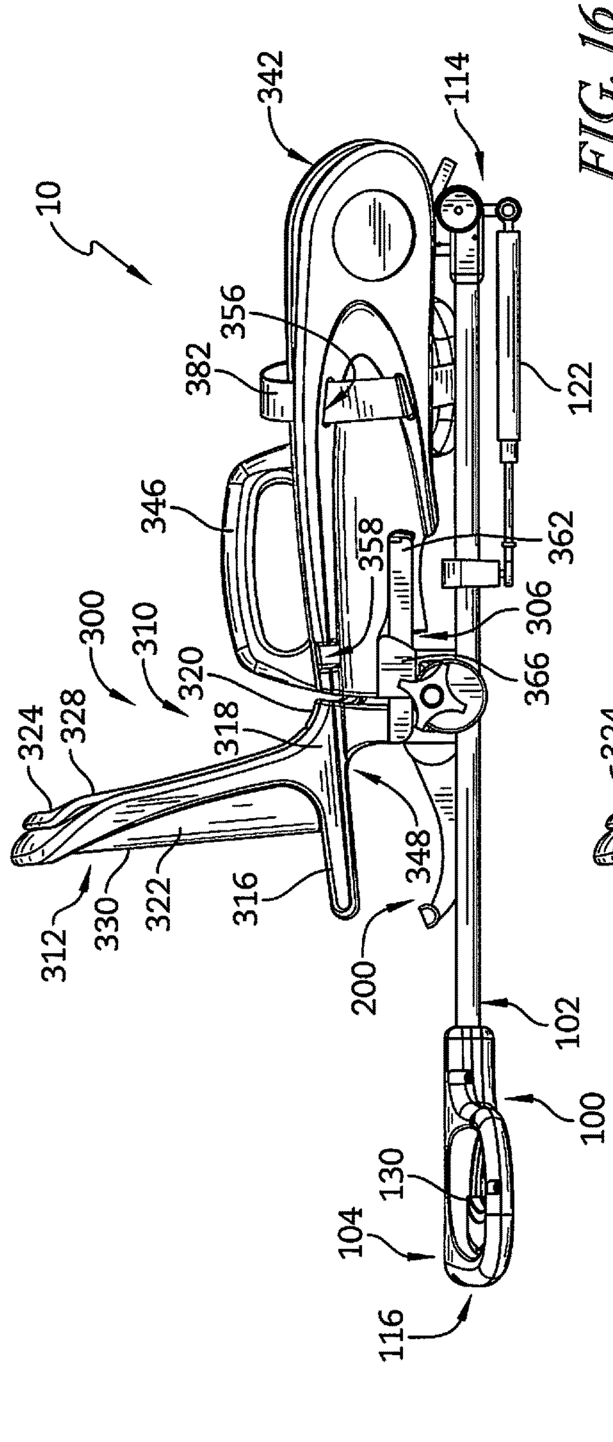
FIG. 16 is an elevation view of the surgical boot of FIG. 11 showing that the surgical boot further includes a connector coupled to the foot support portion and coupled to the lower leg support portion and configured to permit movement of the lower leg support portion relative to the foot support portion to accommodate legs of patients of different sizes.

The ankle portion 310 includes a lower shell 318 and an ankle insert 320 as shown in FIGS. 11 and 16. The lower shell 318 is rigid and coupled to the lockable joint 200 for movement therewith. The ankle insert 320 is coupled to the lower shell 318 to provide a cushioned surface for the patient.

In the illustrative embodiment, the boot handle 316 is coupled to the lower shell 318 for movement therewith and extends away from the lower shell 318 as shown in FIG. 16. Illustratively, the boot handle 316 and the lower shell 318 are monolithically formed. The release lever 202 is located beneath the boot handle 316 in the illustrative embodiment. In the illustrative embodiment, the boot handle 316 is arranged to allow the palm of a user's hand to engage the boot handle 316 while the user's finger extend through boot handle 316 and grip the release lever 202 to allow the user to pull the release lever 202 toward the boot handle 316.

The ankle insert 320 extends along a portion of the lower shell 318 as shown in FIG. 11. The ankle insert 320 comprises rubber in the illustrative embodiment. In other embodiments, the ankle insert 320 comprises foam. In some embodiments, the foam does not have a backing. The ankle insert 320 is removably coupled to the lower shell 318 in the illustrative embodiment. In some embodiments, the ankle insert 320 is coupled to the lower shell 318 with a hook and loop material, snaps, buttons, or any other suitable alternative. In other embodiments, the ankle insert 320 is coupled to the lower shell 318, for example, with adhesive.

The sole portion 312 includes an upper shell 322 and a sole insert 324 as shown in FIGS. 11 and 16. The upper shell 322 is rigid and coupled to the lower shell 318 for movement therewith. The sole insert 324 is coupled to the upper shell 322 to provide a cushioned surface for the patient.

The upper shell 322 is coupled to the lower shell 318 and extends upwardly away from the lower shell 318 as shown in FIGS. 11 and 15. In the illustrative embodiment, the upper shell 322 extends away from the lower shell 318 generally perpendicular to the boot handle 316. Illustratively, the upper shell 322 and the lower shell 318 are monolithically formed. The heel receiving passage 314 is formed between the upper shell 322 and the lower shell 318 and is sized to receive a heel of the patient.

The sole insert 324 extends along a portion of the upper shell 322 to provide a limb-support surface 328 as shown in FIGS. 11 and 16. The sole insert 324 comprises rubber in the illustrative embodiment. In other embodiments, the sole insert 324 comprises foam. In some embodiments, the foam does not have a backing. The sole insert 324 is removably coupled to the upper shell 322 in the illustrative embodiment. In some embodiments, the sole insert 324 is coupled to the upper shell 322 with a hook and loop material, snaps, buttons, or any other suitable alternative. In other embodiments, the sole insert 324 is coupled to the upper shell 322, for example, with adhesive.

Figure 12:
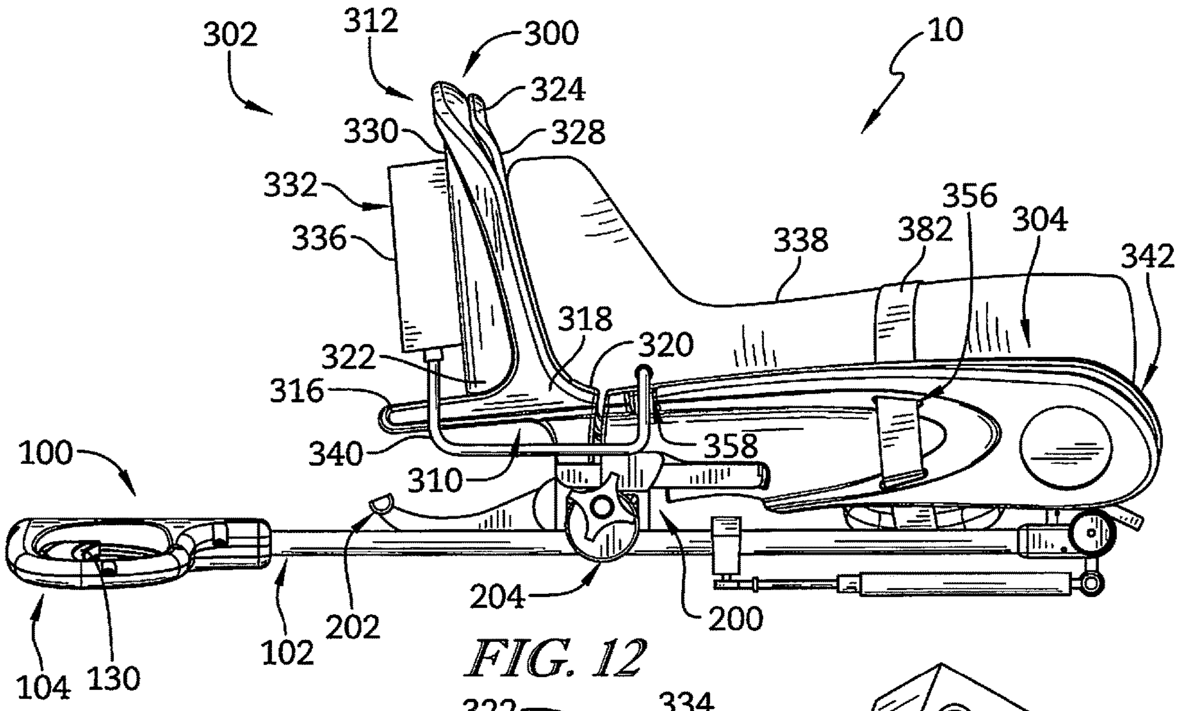
FIG. 12 is a side elevation view of the surgical boot of FIG. 11 showing that an accessory unit such as, for example, a sequential compression device may be mounted to the surgical boot.
Figure 13:
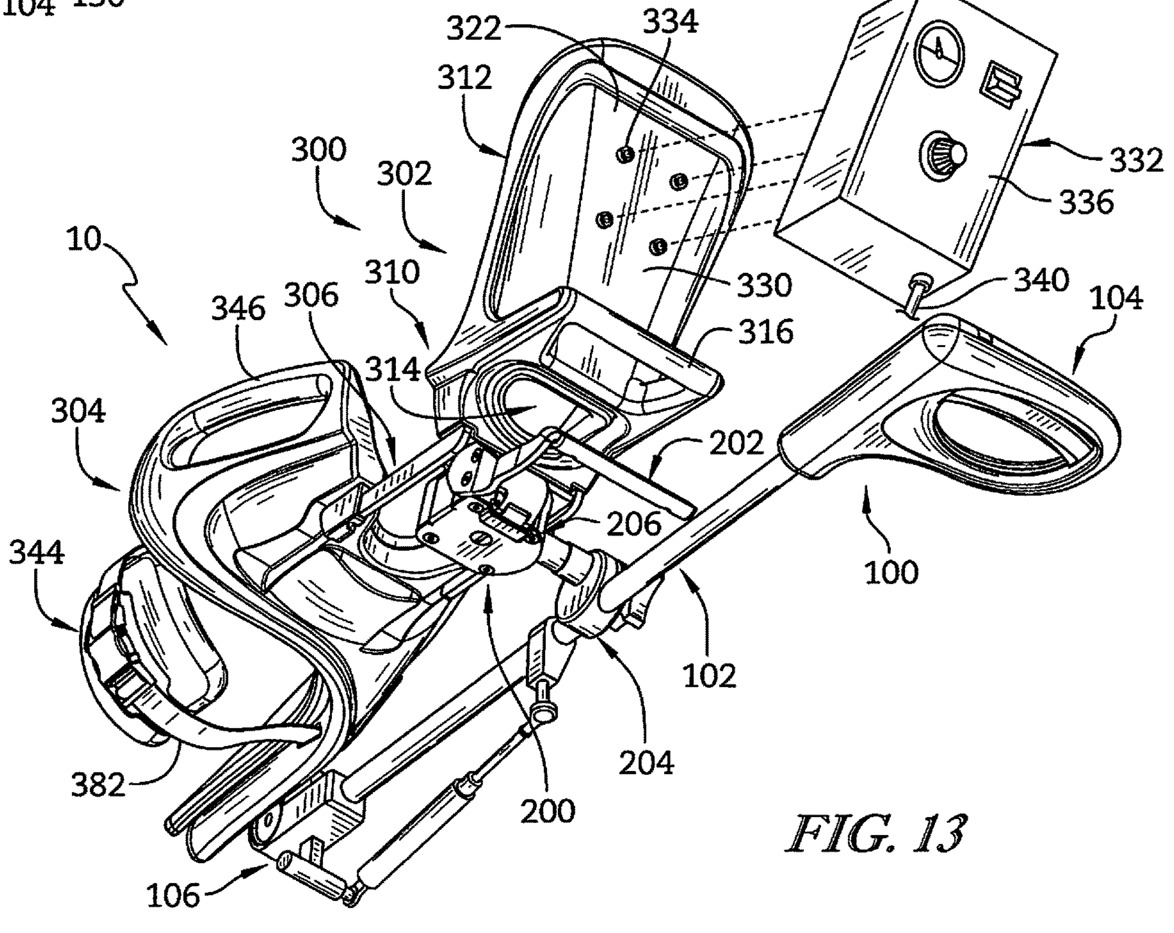
FIG. 13 is a perspective view of the surgical boot of FIG. 12 showing that the sequential compression device may include a pump unit and suggesting that the pump unit may be mounted to the foot support portion of the surgical boot.

The upper shell 322 includes a mount surface 330 configured to couple to and support an accessory unit 332 as shown in FIGS. 12 and 13. The mount surface 330 is spaced apart from and opposite the limb-support surface 328. Illustratively, the mount surface 330 is generally flat.

The mount surface 330 includes at least one mount 334 as shown in FIG. 13. The at least one mount 334 is configured to couple to and support the accessory unit 332. In the illustrative embodiment, the at least one mount 334 comprises a plurality of threaded apertures 334 formed in the mount surface 330. The apertures 334 extend into the upper shell 322 toward the sole insert 324. The apertures 334 are sized to receive threaded fasteners to couple the accessory unit 332 to the upper shell 322. In other embodiments, the apertures 334 are un-threaded. In other embodiments, the mount 334 comprises a hook.

The accessory unit 332 may be any device that is desired to be proximate to the boot stirrup 10 as shown in FIGS. 12 and 13. The accessory unit 332 may be, for example, a pump, an organizer such as one or more hooks, clips, or shelves, a health monitor, or a storage unit. In the illustrative embodiment, the accessory unit 332 comprises a sequential compression device 332 as shown in FIGS. 12 and 13. Illustratively, the sequential compression device 332 includes a pump unit 336 coupled to the mount surface 330. The sequential compression device 332 further includes a garment 338 worn on a patient's limb and at least one conduit 340 extending between the garment 338 and the pump unit 336. The lower leg support portion 304 is formed to include a notch 358 that receives a portion of the at least one conduit 340 as shown in FIG. 12.

The lower leg support portion 304 includes a calf portion 342, a kneepad 344, and a calf handle 346 as shown in FIGS. 11-17. The calf portion 342 supports a patient's calf and couples the lower leg support portion 304 to the lower foot support portion 302. The kneepad 344 is coupled to the calf portion 342 and is configured to support a patient's knee. The calf handle 346 is configured to be gripped by a user to move the lower leg support portion 304 relative to the lower foot support portion 302 and/or the longitudinal axis 108.

The calf portion 342 includes an elongated shell 350 and a calf insert 352 as shown in FIGS. 11 and 16. The elongated shell 350 is rigid and coupled to a portion of the connector 306 for movement therewith. The calf insert 352 is coupled to the elongated shell 350 to provide a cushioned surface for the patient.

The elongated shell 350 is formed to receive a calf and knee of a patient as shown in FIG. 11. The elongated shell 350 is formed to include a lower leg receiving aperture 354, a strap receiving slot 356, and the notch 358. The lower leg receiving aperture 354 extends into the elongated shell 350 to allow the elongated shell 350 to receive legs of varying sizes. The strap receiving slot 356 extends through the elongated shell 350. The strap receiving slot 356 receives a strap 382 included in the kneepad 344 to couple the kneepad 344 to the elongated shell 350. The strap receiving slot 356 is formed in the elongated shell 350 to locate the kneepad 344 in the lower leg receiving aperture 354 when the kneepad 344 is coupled to the elongated shell 350. The notch 358 is formed to receive the at least one conduit 340 and to allow the at least one conduit 340 to extend around the calf portion 342 while being minimally intrusive.

The calf insert 352 extends along a portion of the elongated shell 350 as shown in FIGS. 11 and 16. The calf insert 352 comprises rubber in the illustrative embodiment. In other embodiments, the calf insert 352 comprises foam. In some embodiments, the foam does not have a backing. The calf insert 352 is removably coupled to the elongated shell 350 in the illustrative embodiment. In some embodiments, the calf insert 352 is coupled to the elongated shell 350 with a hook and loop material, snaps, buttons, or any other suitable alternative. In other embodiments, the calf insert 352 is coupled to the elongated shell 350, for example, with adhesive.

Figure 17:
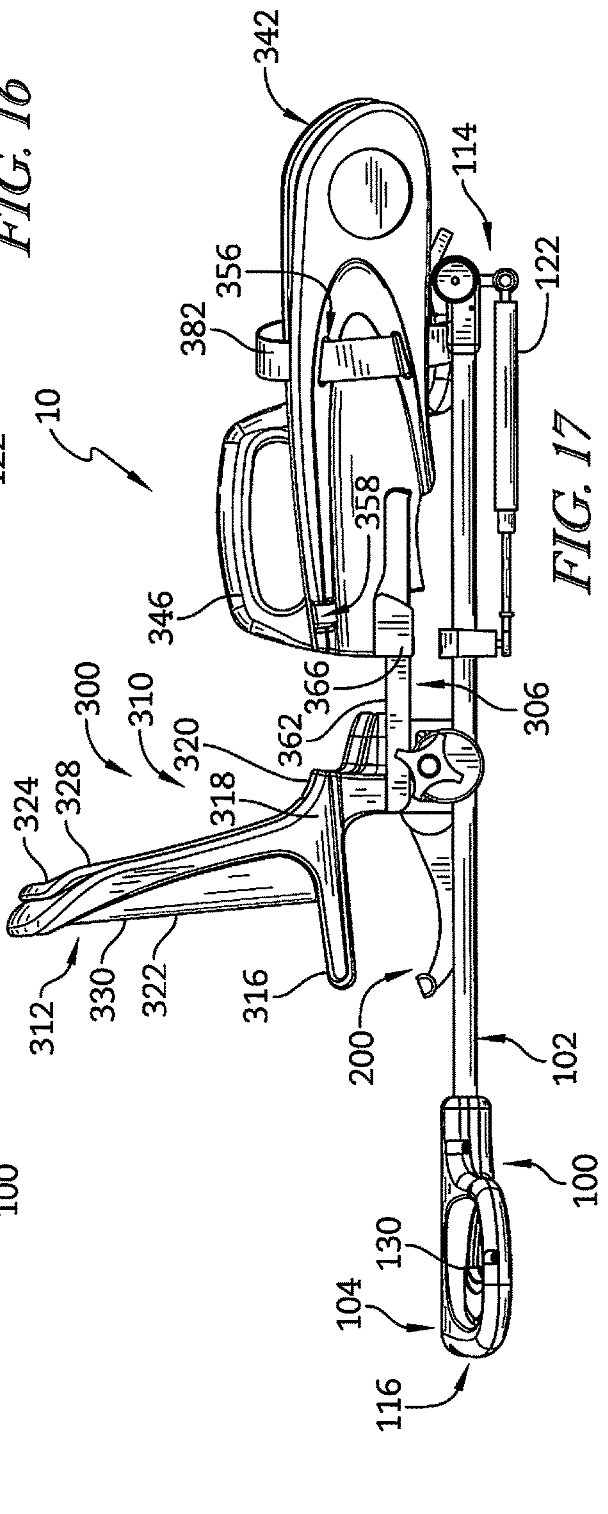
FIG. 17 is a side elevation view of the surgical boot of FIG. 16 showing that the lower leg support has been moved relative to the foot support portion to lengthen the surgical boot.

In the illustrative embodiment, the calf handle 346 is coupled to the elongated shell 350 for movement therewith and extends upwardly away from the connector 306 as shown in FIGS. 16 and 17. Illustratively, the calf handle 346 and the elongated shell 350 are monolithically formed.

Figure 14:
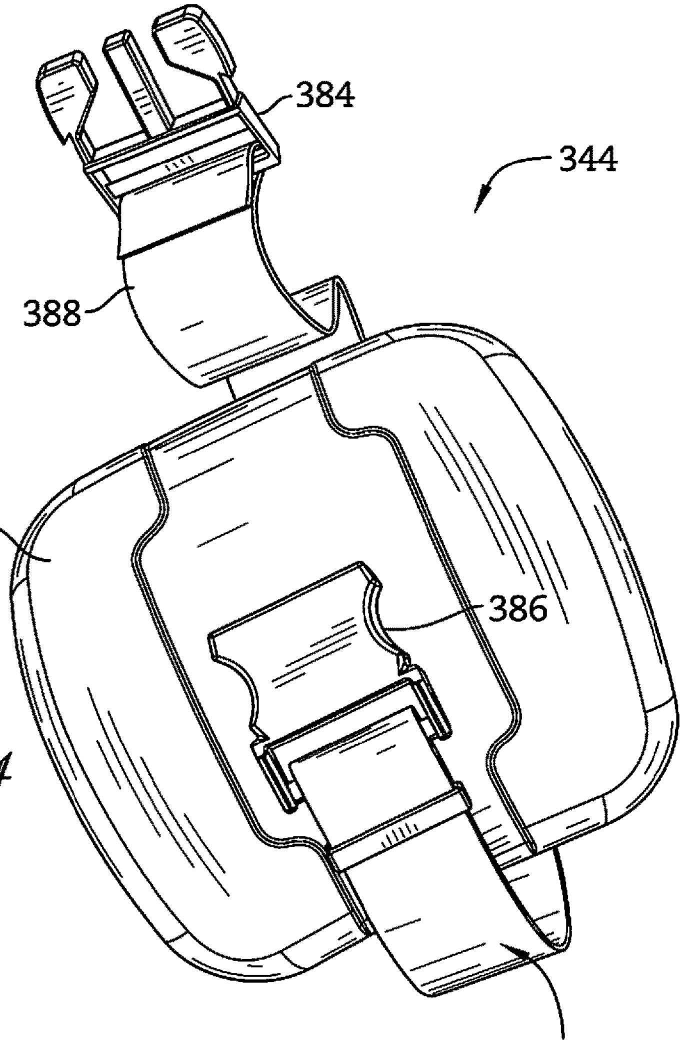
FIG. 14 is a perspective view of a kneepad included in the surgical boot and showing that a strap of the kneepad may be unlocked to allow the kneepad to receive a leg of a patient.

The kneepad 344 is coupled to the calf portion 342 and is configured to support a patient's knee as shown in FIGS. 11, 14, and 15. The kneepad 344 includes a pad insert 380 and the strap 382. The pad insert 380 is coupled to the strap 382 and is configured to provide a cushioned surface for the patient.

The pad insert 380 is contoured to receive a patient's knee as shown in FIGS. 11, 14, and 15. The pad insert 380 comprises rubber in the illustrative embodiment. In other embodiments, the pad insert 380 comprises foam. In some embodiments, the foam does not have a backing.

The strap 382 includes a male fastener 384, a female fastener 386, and a belt 388 as shown in FIGS. 14 and 15. The female fastener 386 is coupled to a first end of the belt 388 and coupled to the pad insert 380. The male fastener 384 is coupled to a second end of the belt 388. The belt 388 extends through the strap receiving slot 356 formed in the lower leg support portion 304 to couple the kneepad 344 to the calf portion 342. The male fastener 384 is removably coupled to the female fastener 386 to secure the kneepad 344 to a patient's knee and to block the kneepad 344 from moving relative to the patient's knee.

Figure 18:
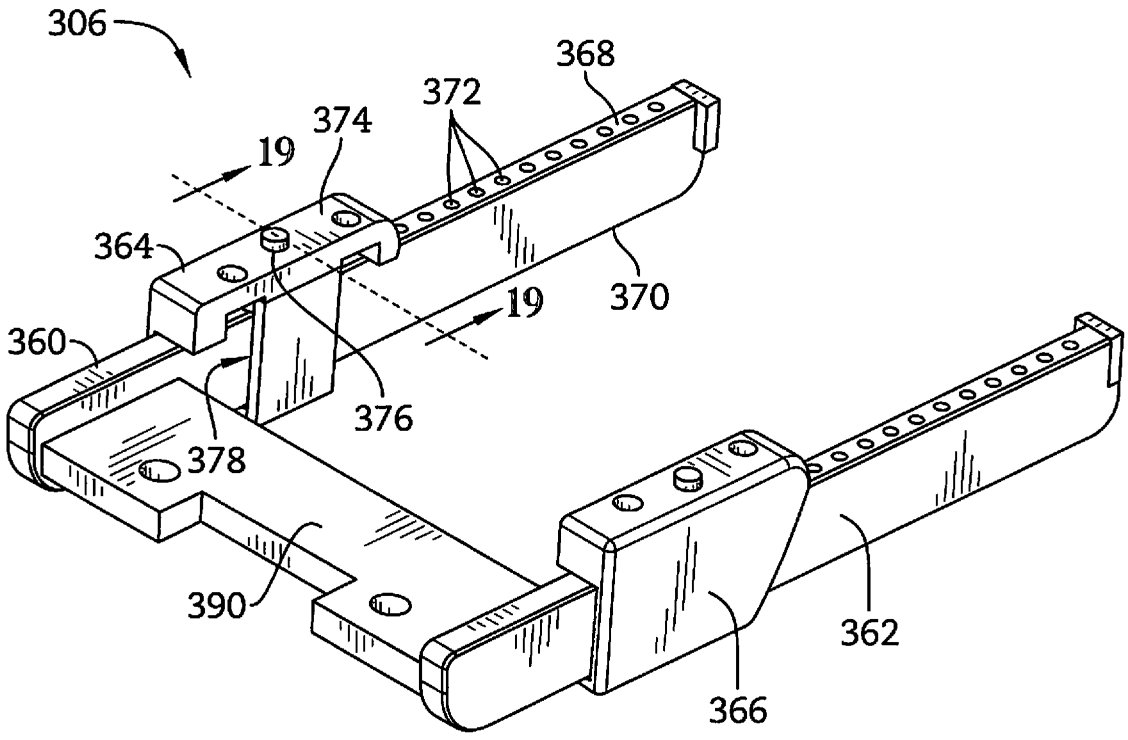
FIG. 18 is a perspective view of the connector included in the surgical boot showing that the connector includes a pair of rails arranged to couple to the foot support portion and a pair of tracks extending around the rails and arranged to couple to the lower leg support portion.
Figure 19:
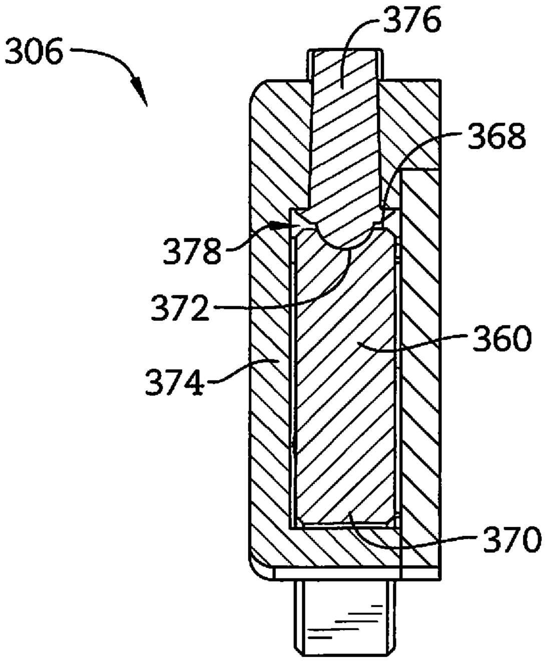
FIG. 19 is sectional view of the connector taken along line 19-19 of FIG. 18 showing that each track includes a pin that extends through the track into an indentation formed in the rail to block movement of the track relative to the rail.

The connector 306 is coupled to the foot support portion 302 and coupled to the lower leg support portion 304 as shown in FIGS. 18 and 19. The connector 306 is configured to permit movement of the lower leg support portion 304 relative to the foot support portion 302 to accommodate legs of patients of different sizes. In the illustrative embodiment, the connector 306 is configured to permit linear movement of the lower leg support portion 304 relative to the foot support portion 302.

The connector 306 includes a first rail 360, a second rail 362, a first track 364, and a second track 366 as shown in FIGS. 18 and 19. The first rail 360 and the second rail 362 extend away from the foot support portion 302 to support the first track 364 and the second track 366. The first track 364 and the second track 366 are configured to translate along the first and second rails 360, 362 to move the lower leg support portion 304.

The first rail 360 is coupled to the foot support portion 302 and coupled to the lockable joint 200 as shown in FIGS. 18 and 19. The first rail 360 extends away from the heel support region 348 toward the calf portion 342. The first rail 360 is configured to support the first track 364 and, thus, the lower leg support portion 304. In the illustrative embodiment, the first rail 360 is cantilevered. Illustratively, the first rail 360 further includes a track stop at both ends of the first rail 360. The track stop is arranged to engage the first track 364 at an end of the first rail 360 to mechanically block the first track 364 from escaping the first rail 360.

The first rail 360 includes an upper surface 368, a lower surface 370 spaced apart from the upper surface 368, and a plurality of indentations 372 as shown in FIGS. 18 and 19. Illustratively, the indentations 372 extend into the upper surface 368 toward the lower surface 370. In other embodiments, the indentations 372 extend into the lower surface 370 toward the upper surface 368. In the illustrative embodiment, the indentations 372 are curved. In other embodiments, the indentations may be rectangular or any other non-curved shape.

The second rail 362 is spaced apart from the first rail 360 as shown in FIG. 18. The second rail 362 is substantially similar to the first rail 360. As such, the second rail 362 is not discussed in detail. In the illustrative embodiment, the connector 306 further includes a carriage plate 390 as shown in FIG. 18. The first and second rails 360, 362 are coupled to the carriage plate 390 and extend from the carriage plate 390. The carriage plate 390 is coupled to the foot support portion 302 and coupled to the lockable joint 200.

The first track 364 is arranged around the first rail 360 as shown in FIG. 18. The first track 364 is coupled to the lower leg support portion 304 for movement therewith. The first track 364 is configured to translate on the first rail 360 to cause the lower leg support portion 304 to move relative to the foot support portion 302.

The first track 364 includes a track body 374 and a track pin 376 as shown in FIGS. 18 and 19. The track body 374 is arranged around the first rail 360 and the track pin 376 extends through the track body 374 into one of the indentations 372 to block the first track 364 from moving relative to the first rail 360. The track body 374 is formed to include a rail receiving passage 378 that extends through the track body 374. The rail receiving passage 378 receives the first rail 360. The track pin 376 extends through a top portion of the track body 374 into the rail receiving passage 378. In the illustrative embodiment, the track pin 376 has a flared portion to couple the track pin 376 to the track body 374. Illustratively, the end of the track pin 376 is curved and received in one of the curved indentations 372. In other embodiments, the track pin 376 and the indentations are rectangular or a non-curved shape.

The second track 366 is substantially similar to the first track 364. As such, the second track 366 is not discussed in detail.

In operation, the track pin 376 extends into one of the indentations 372 to block the lower leg support portion 304 from moving relative to the foot support portion 302 as shown in FIGS. 18 and 19. A user may lift up on the lower leg support portion 304 to cause the track pin 376 to disengage the indentation 372. The user may then pull the lower leg support portion 304 away from the foot support portion 302 to cause the tracks 364, 366 to translate along the rails 360, 362 to increase the distance between the foot support portion 302 and the lower leg support portion 304. Similarly, the user may push the lower leg support portion 304 toward the foot support portion 302 to decrease the distance between the foot support portion 302 and the lower leg support portion 304. The user may then release the lower leg support portion 304 to allow the track pin 376 to engage another of the indentations 372 to block the lower leg support portion 304 from moving relative to the foot support portion 302.

Although certain embodiments have been described in detail above, variations and modifications exist within the scope and spirit of this disclosure as described and as defined in the following claims.

The invention claimed is:

1. A support arm for use with a surgical table, the support arm comprising a spar having a proximal end, a distal end spaced apart from the proximal end, and an actuator rod extending between the proximal and distal ends along a longitudinal axis of the support arm, a lockable swivel joint coupled to the actuator rod at the proximal end of the spar and coupled to the surgical table, the lockable swivel joint being configured to permit movement of the spar relative to the surgical table about a plurality of axes, and a spar handle coupled to the distal end of the spar and including a handle housing coupled to the spar and a spar lever coupled to the actuator rod and configured to move linearly and generally parallel to the longitudinal axis relative to the handle housing to cause the actuator rod to rotate about the longitudinal axis between a first orientation in which the lockable swivel joint is locked and a second orientation in which the lockable swivel joint is unlocked.

2. The support arm of claim 1, wherein the spar lever includes a lever slide arranged around the actuator rod and a lever handle extending radially away from the lever slide relative to the longitudinal axis and the lever slide is configured to move with the lever handle and cause the actuator rod to rotate between the first and second orientations when the lever handle is moved linearly and generally parallel to the longitudinal axis.

3. The support arm of claim 2, wherein the lever slide includes an inner surface, an outer surface radially spaced apart from the inner surface, and a sidewall extending radially through the lever slide between the inner and outer surfaces, the sidewall is formed to define a slot extending axially and circumferentially along the lever slide, the spar further includes an actuator axle coupled to the actuator rod for movement therewith, and the actuator axle extends into the slot.

4. The support arm of claim 3, wherein the actuator axle extends through the actuator rod into the slot and the lever slide is arranged to move linearly along the longitudinal axis to cause the sidewall to engage the actuator axle and move the actuator axle circumferentially about the longitudinal axis to cause the actuator rod to rotate between the first and second orientations.

5. The support arm of claim 4, wherein the actuator axle includes a pin and a bearing arranged around the pin, the pin extends through the actuator rod into the slot, and the bearing is positioned between the pin and the sidewall.

6. The support arm of claim 1, wherein the handle housing includes a grip portion that extends radially outwardly relative to the longitudinal axis of the spar such that the grip portion is cantilevered from the spar.

7. The support arm of claim 6, wherein the grip portion has a finger receiving opening sized to receive a user's fingers.

8. The support arm of claim 7, wherein a finger accessible portion of the lever handle extends into the finger receiving opening when the actuator rod is in the first orientation.

9. The support arm of claim 6, further comprising a pinch guard located between the handle housing and the lever handle.

10. The support arm of claim 1, wherein the spar comprises a first straight tube.

11. The support arm of claim 10, wherein the lever slide comprises a second straight tube situated within a bore of the first straight tube.

12. The support arm of claim 1, further comprising a pneumatic cylinder coupled to the spar and to the lockable swivel joint.

13. The support arm of claim 12, wherein the pneumatic cylinder has a first end coupled at a first attachment point to the spar and a second end coupled at a second attachment point to the lockable swivel joint.

14. The support arm of claim 13, further comprising an arm clamp coupled to the spar and a surgical boot coupled to the arm clamp.

15. The support arm of claim 14, wherein the arm clamp is coupled to spar between the spar handle and the first attachment point.

16. The support arm of claim 15, wherein the arm clamp is releasable to slide along the spar between the spar handle and the first attachment point and wherein the arm clamp is lockable in position on the spar at any position between the spar handle and the first attachment point.

17. The support arm of claim 1, further comprising an arm clamp coupled to the spar and a surgical boot coupled to the arm clamp.

18. The support arm of claim 17, wherein the arm clamp is releasable to slide along the spar so that a position of the surgical boot along the spar is adjustable and wherein the arm clamp is lockable in position on the spar.

19. The support arm of claim 18, further comprising a lockable joint attached to the surgical boot and an arm interconnecting the arm clamp and the lockable joint.

20. The support arm of claim 19, further comprising a release lever coupled to the lockable joint, the release lever being movable relative to the lockable joint to unlock the surgical boot for pivoting movement relative to the arm about at least one axis.

* * * * *